US012669973B2

(12) United States Patent
Jiang et al.

(10) Patent No.: US 12,669,973 B2
(45) Date of Patent: Jun. 30, 2026

(54) WIRELESS AUXILIARY STREAM DEVICE, AND SCREEN PROJECTION METHOD AND SYSTEM BASED ON WIRELESS AUXILIARY STREAM DEVICE

(71) Applicant: YEALINK (XIAMEN) NETWORK TECHNOLOGY CO., LTD., Xiamen (CN)

(72) Inventors: Hu Jiang, Xiamen (CN); Zhengling Lin, Xiamen (CN); Yide Zhang, Xiamen (CN); Wei Su, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/817,215

(22) Filed: Aug. 27, 2024

(65) Prior Publication Data

US 2024/0419387 A1 Dec. 19, 2024

Related U.S. Application Data

(63) Continuation-in-part of application No. 17/842,821, filed on Jun. 17, 2022, now abandoned.

(30) Foreign Application Priority Data

Jun. 18, 2021 (CN) .......................... 202110677507.0

(51) Int. Cl.
*G06F 3/14* (2006.01)
*H04W 76/15* (2018.01)
(52) U.S. Cl.
CPC .......... *G06F 3/1454* (2013.01); *H04W 76/15* (2018.02)

(58) Field of Classification Search
CPC ............. G06F 3/04817; G06F 3/04842; G06F 3/1454; G06F 3/1423; G06F 3/1292; G06F 13/00; G06F 3/04
See application file for complete search history.

(56) References Cited

U.S. PATENT DOCUMENTS 10,171,865 B2 * 1/2019 Minemura ........... H04N 21/431
10,474,416 B1 * 11/2019 Farivar ............... H04L 65/4015
(Continued)

FOREIGN PATENT DOCUMENTS

CN 110221798 A 9/2019
CN 112492364 A 3/2021
CN 111193898 B 6/2021

*Primary Examiner* — William Boddie
*Assistant Examiner* — Alecia D English

(57) ABSTRACT

Provided are a wireless auxiliary stream device, and screen projection method and system based on a wireless auxiliary stream device. The wireless auxiliary stream device is connected to a terminal device and an extended display device. The wireless auxiliary stream device includes: a first transmission module configured to establish a first connection between the wireless auxiliary stream device and the terminal device; an interaction interface generation module configured to display an interaction interface when the terminal device is connected; a to-be-projected data obtaining module configured to: when a command of a display key of a target program is received, obtain to-be-projected data, and receive, through the first transmission module, the to-be-projected data sent by the terminal device; and a second transmission module configured to establish a second connection between the wireless auxiliary stream device and the extended display device, and transmit the to-be-projected data to the extended display device.

14 Claims, 17 Drawing Sheets

(56)　　　　　References Cited

U.S. PATENT DOCUMENTS

| | | | | |
|---|---|---|---|---|
| 11,178,357 B1 * | 11/2021 | Goddard Rosa | ....... | H04N 7/147 |
| 2011/0225542 A1 * | 9/2011 | Schmieder | ............ | G06F 3/1454 |
| | | | | 715/807 |

* cited by examiner

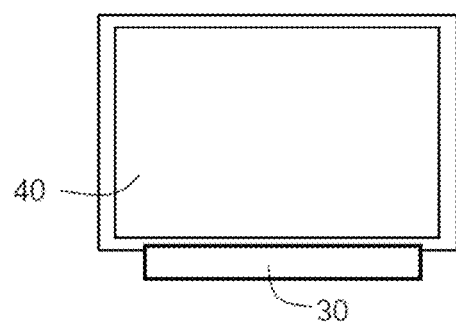
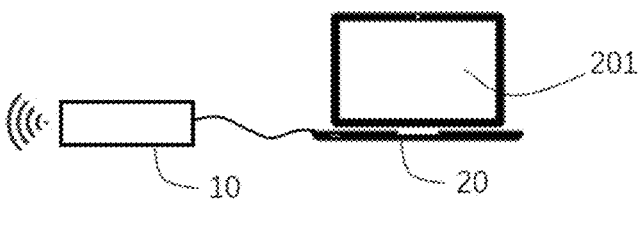
FIG. 1
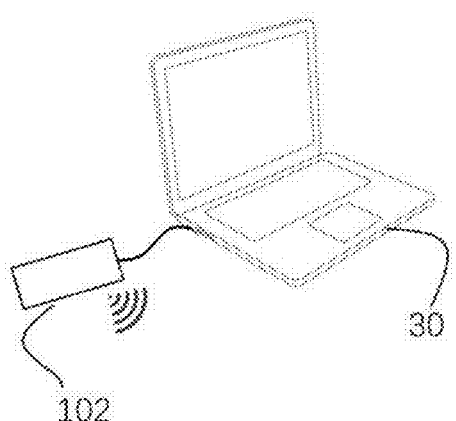
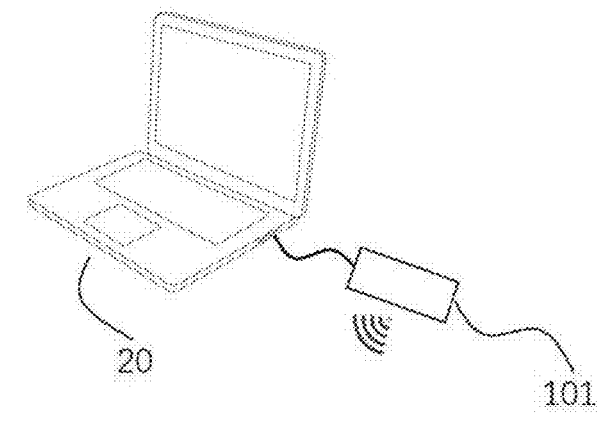
FIG. 2
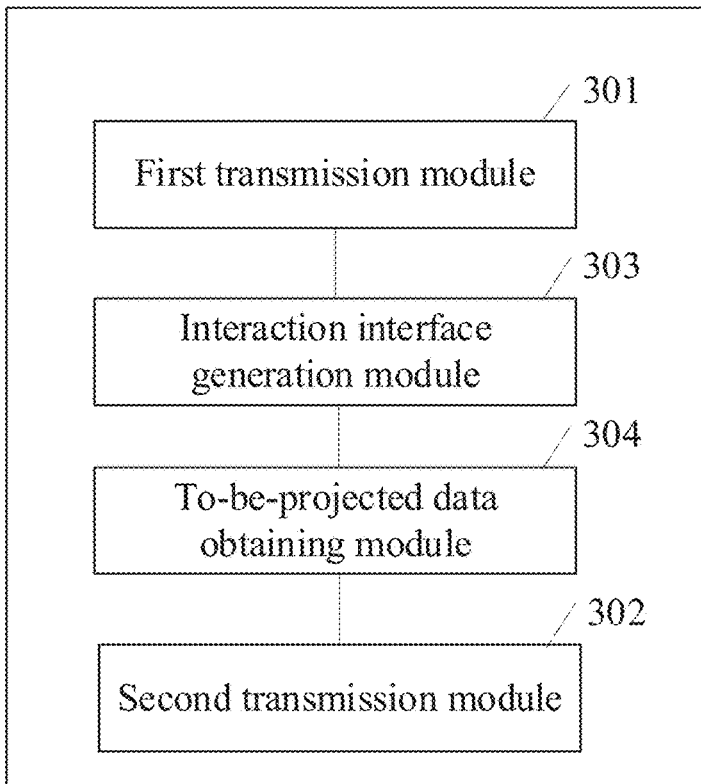
FIG. 3

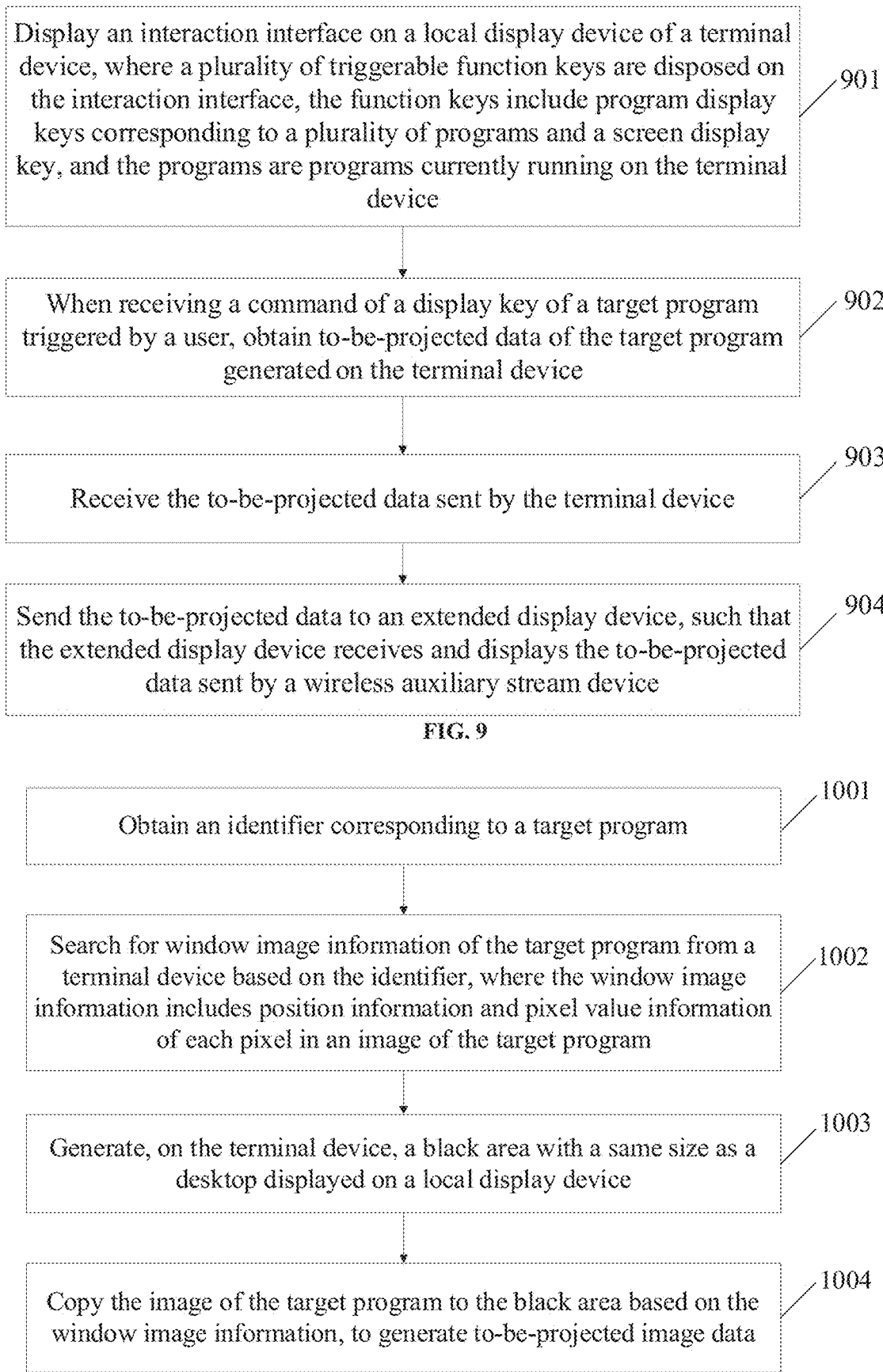

Display an interaction interface on a local display device of a terminal device, where a plurality of triggerable function keys are disposed on the interaction interface, the function keys include program display keys corresponding to a plurality of programs and a screen display key, and the programs are programs currently running on the terminal device

901

When receiving a command of a display key of a target program triggered by a user, obtain to-be-projected data of the target program generated on the terminal device

902

Receive the to-be-projected data sent by the terminal device

903

Send the to-be-projected data to an extended display device, such that the extended display device receives and displays the to-be-projected data sent by a wireless auxiliary stream device

Obtain an identifier corresponding to a target program

1001

Search for window image information of the target program from a terminal device based on the identifier, where the window image information includes position information and pixel value information of each pixel in an image of the target program

1002

Generate, on the terminal device, a black area with a same size as a desktop displayed on a local display device

1003

Copy the image of the target program to the black area based on the window image information, to generate to-be-projected image data

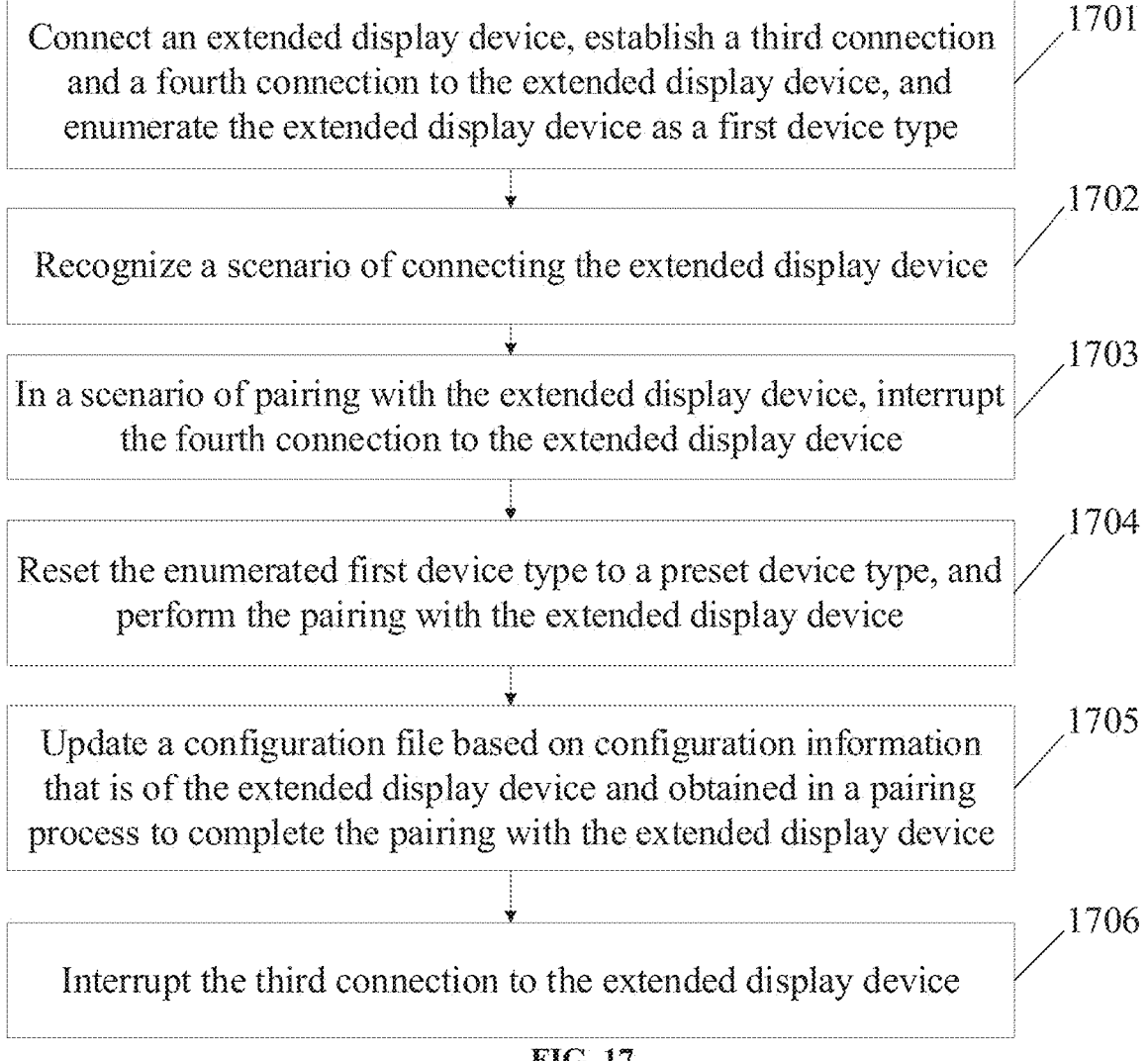

Connect an extended display device, establish a third connection and a fourth connection to the extended display device, and enumerate the extended display device as a first device type / 1701

Recognize a scenario of connecting the extended display device / 1702

In a scenario of pairing with the extended display device, interrupt the fourth connection to the extended display device / 1703

Reset the enumerated first device type to a preset device type, and perform the pairing with the extended display device / 1704

Update a configuration file based on configuration information that is of the extended display device and obtained in a pairing process to complete the pairing with the extended display device / 1705

Interrupt the third connection to the extended display device / 1706

FIG. 17

WIRELESS AUXILIARY STREAM DEVICE, AND SCREEN PROJECTION METHOD AND SYSTEM BASED ON WIRELESS AUXILIARY STREAM DEVICE

CROSS-REFERENCE TO RELATED APPLICATIONS

The present application is a Continuation-In-Part Application of U.S. application Ser. No. 17/842,821 filed on Jun. 17, 2022, which claims the benefit of Chinese Patent Application No. 202110677507.0 filed on Jun. 18, 2021, the contents of which are hereby incorporated by reference.

TECHNICAL FIELD

The present disclosure relates to the technical field of data processing, and in particular, to a wireless auxiliary stream device, and a screen projection method and system based on a wireless auxiliary stream device.

BACKGROUND

With the development of technologies, people have an increasing demand for content sharing. In a conference, content displayed on a terminal device such as a computer or a mobile phone needs to be shared on another device for display, or the displayed content needs to be sent to a remote end through a remote video conferencing device. A common approach is to transmit audio and video signals to an external display screen or video conferencing device through a display output interface (VGA, DVI, HDMI, DisplayPort (DP), or the like) of the computer in a wired manner. However, due to inconsistent video output interfaces of computers, different computers may be configured with different video output interfaces. A conference projection device or an auxiliary stream sending device needs to be equipped with different interfaces or connection lines to be compatible with different computers, resulting in many connection lines on a desktop, difficult deployment, and a cost waste.

In addition, screen projection is used more frequently, for example, is performed on content on the computer during a meeting. Currently, in the prior art, the Chinese patent CN111193898B discloses a wireless screen projector with a physical key. The wireless screen projector is connected to a to-be-projected apparatus. After a user presses the key of the wireless screen projector, content on a desktop of the computer is sent to an external touch screen to share the content on the desktop of the computer. However, when the wireless auxiliary stream device is used, if the key is clicked, screen projection is performed an entire screen and all programs of the to-be-projected apparatus, resulting in leakage of privacy of the user to all participants. For example, if a chat tool receives a message when the user is making a PPT presentation, the message will be also displayed during screen projection, causing the leakage of the privacy of the user.

SUMMARY

Embodiments of the present disclosure provide a wireless auxiliary stream device, and a screen projection method and system based on a wireless auxiliary stream device, to solve problems that a conference projection device or an auxiliary stream device needs to be equipped with a plurality of standard interfaces and user privacy is leaked when implementing screen projection.

A first aspect of the embodiments of the present disclosure provides a wireless auxiliary stream device, where the wireless auxiliary stream device is connected to both a terminal device and an extended display device; and the wireless auxiliary stream device includes:

a first transmission module configured to establish a first connection between the wireless auxiliary stream device and the terminal device;

an interaction interface generation module configured to display an interaction interface on a local display device of the terminal device when the terminal device is connected, where a plurality of triggerable function keys are provided on the interaction interface, the function keys include program display keys corresponding to a plurality of programs and a screen display key, and the programs are programs currently running on the terminal device;

a to-be-projected data obtaining module configured to: when a command of a display key of a target program triggered by a user is received, obtain to-be-projected data of the target program generated on the terminal device, and receive, through the first transmission module, the to-be-projected data sent by the terminal device; and a second transmission module configured to establish a second connection between the wireless auxiliary stream device and the extended display device, and transmit the to-be-projected data to the extended display device, whereby the extended display device performs screen projection on the to-be-projected data.

In an implementation example, the wireless auxiliary stream device further includes a storage module, and the storage module is configured to store a screen projection program file, and transmit the screen projection program file to the terminal device through the first transmission module when the terminal device is connected, whereby the terminal device installs the screen projection program file, where the screen projection program file includes the interaction interface generation module and the to-be-projected data obtaining module.

In an implementation example, the screen projection program file further includes a first encoding and decoding module;

the first transmission module is further configured to recognize whether a transmission port of the terminal device connected to the wireless auxiliary stream device supports a preset communication protocol;

the first encoding and decoding module is configured to perform first encoding on the to-be-projected data when it is recognized that the transmission port of the terminal device does not support the preset communication protocol;

the first transmission module is further configured to receive firstly encoded to-be-projected data sent by the terminal device; and the second transmission module is further configured to transmit the firstly encoded to-be-projected data to the extended display device, whereby the extended display device performs the screen projection on the firstly encoded to-be-projected data after decoding the firstly encoded to-be-projected data.

In an implementation example, the wireless auxiliary stream device further includes a second encoding and decoding module;

the first transmission module is further configured to recognize whether a transmission port of the terminal device connected to the wireless auxiliary stream device supports a preset communication protocol;

the second encoding and decoding module is configured to: when it is recognized that the transmission port of the terminal device supports the preset communication protocol, perform second encoding on the to-be-projected data after receiving the to-be-projected data sent by the terminal device; and the second transmission module is further configured to transmit secondly encoded to-be-projected data to the extended display device, whereby the extended display device performs the screen projection on the secondly encoded to-be-projected data after decoding the secondly encoded to-be-projected data.

In an implementation example, the to-be-projected data includes image data and audio data.

In an implementation example, the wireless auxiliary stream device further includes a pairing module and a configuration file updating module;

the first transmission module is further configured to: before the terminal device is connected, establish a third connection to the extended display device when the extended display device is connected;

the second transmission module is further configured to establish a fourth connection to the extended display device when the third connection to the extended display device is established, recognize a scenario of connecting the extended display device, and interrupt the fourth connection to the extended display device when recognizing a scenario of pairing with the extended display device;

the pairing module is configured to: before the terminal device is connected, in the scenario of pairing with the extended display device, reset an enumerated device type to a preset device type, and perform enumeration to complete the pairing with the extended display device;

the configuration file updating module is configured to update a configuration file of the wireless auxiliary stream device based on configuration information that is of the extended display device and obtained in a pairing process, to complete the pairing;

the first transmission module is further configured to interrupt the third connection to the extended display device after the pairing is completed; and the second transmission module is further configured to: after the pairing is completed, establish the second connection to the extended display device when the terminal device is connected, to establish data transmission between the wireless auxiliary stream device and the extended display device.

In an implementation example, the first transmission module is a wired transmission module of a universal serial bus (USB) interface, and the second transmission module is a wireless transmission module.

A second aspect of the embodiments of the present disclosure provides a screen projection method based on a wireless auxiliary stream device, applicable to a wireless auxiliary stream device, where the wireless auxiliary stream device establishes a first connection to a terminal device and a second connection to an extended display device; and the screen projection method includes:

displaying an interaction interface on a local display device of the terminal device, where a plurality of triggerable function keys are provided on the interaction interface, the function keys include program display keys corresponding to a plurality of programs and a screen display key, and the programs are programs currently running on the terminal device;

when receiving a command of a display key of a target program triggered by a user, obtaining to-be-projected data of the target program generated on the terminal device;

receiving the to-be-projected data sent by the terminal device; and sending the to-be-projected data to the extended display device, whereby the extended display device receives and displays the to-be-projected data sent by the wireless auxiliary stream device.

In an implementation example, before the displaying an interaction interface on a local display device of the terminal device, the screen projection method further includes:

transmitting a screen projection program file to the terminal device when the terminal device is connected, whereby the terminal device installs the screen projection program file, where the screen projection program file is used to display the interaction interface on the local display device of the terminal device, and when the command of the display key of the target program triggered by the user is received, the to-be-projected data of the target program generated on the terminal device is obtained from the terminal device.

In an implementation example, the to-be-projected data includes image data and audio data.

In an implementation example, there are N target programs, where N≥1; and when the to-be-projected data is the image data, the obtaining to-be-projected data of the target program generated on the terminal device specifically includes:

obtaining an identifier corresponding to the target program;

searching for window image information of the target program from the terminal device based on the identifier, where the window image information includes position information and pixel value information of each pixel in an image of the target program;

generating, on the terminal device, a black area with a same size as a desktop displayed on the local display device; and copying the image of the target program to the black area based on the window image information, to generate the to-be-projected image data.

In an implementation example, there are N target programs, where N≥1; the programs include the target program and a non-target program located at an upper layer of the target program; and a size of an image displayed by the extended display device is consistent with a size of an image displayed by the local display device, and coordinate axes established by the extended display device and the local display device are consistent; and when the to-be-projected data is the image data, the obtaining to-be-projected data of the target program generated on the terminal device specifically includes:

recognizing an overlapping portion between an image of the target program and an image of the non-target program, where the overlapping portion is an intersection window between a window of the target program and a window of the non-target program located at the upper layer of the target program;

removing the overlapping portion in the image of the target program to obtain a to-be-projected image;

generating, on the terminal device, a black area with a same size as a desktop displayed on the local display device; and obtaining an outer frame coordinate of the to-be-projected image, copying the to-be-projected image to the black area based on the outer-frame coordinate to generate the to-be-projected image data.

In an implementation example, a process of obtaining the outer frame coordinate of the to-be-projected image includes:

obtaining all images displayed on the local display device;

recognizing a plurality of outer frame coordinates of the target program on all the images;

obtaining the outer frame coordinate of the to-be-projected image based on the outer frame coordinates of the target program and the overlapping portion.

In an implementation example, there are N target programs, where N≥1; and when the to-be-projected data is the audio data, the to-be-projected data generated on the terminal device is source audio data of the target program on the terminal device.

In an implementation example, there are N target programs, where N≥1; and when the to-be-projected data is the audio data, the receiving the to-be-projected data sent by the terminal device, and sending the to-be-projected data to the extended display device, whereby the extended display device receives and displays the to-be-projected data sent by the wireless auxiliary stream device specifically includes:

receiving source audio data sent by the terminal device;

encoding the source audio data; and sending encoded source audio data to the extended display device, whereby the extended display device receives, decodes, and plays the to-be-projected data sent by the wireless auxiliary stream device.

In an implementation example, before the terminal device is connected, the screen projection method further includes:

connecting the extended display device, establishing a third connection and a fourth connection to the extended display device, and enumerating the extended display device as a first device type;

recognizing a scenario of connecting the extended display device;

in a scenario of pairing with the extended display device, interrupting the fourth connection to the extended display device;

resetting the enumerated first device type to a preset device type, and performing the pairing with the extended display device;

updating a configuration file based on configuration information that is of the extended display device and obtained in a pairing process to complete the pairing with the extended display device; and interrupting the third connection to the extended display device.

In an implementation example, the first connection and the third connection are used for wired transmission through a USB interface, and the second connection and the fourth connection are used for wireless transmission.

A third aspect of the embodiments of the present disclosure provides a screen projection system, including a terminal device, a wireless auxiliary stream device, and an extended display device, where the terminal device is connected to the wireless auxiliary stream device;

the extended display device is connected to the wireless auxiliary stream device; and the wireless auxiliary stream device is the wireless auxiliary stream device described in the first aspect.

The present disclosure has following advantages:

In the present disclosure, the wireless auxiliary stream device is connected to both the terminal device and the extended display device. The wireless auxiliary stream device is in the same physical location or network environment as the terminal device and the extended display device, such as in the same conference room or the same Local Area Network (LAN). The wireless auxiliary stream device, the terminal device, and the extended display device constitute a screen projection system. The wireless auxiliary stream device is connected to the extended display device, the terminal device does not need to be connected to the extended display device, and the wireless auxiliary stream device can be connected to the terminal device through a standard unified interface. Therefore, the wireless auxiliary stream device does not need to be equipped with a plurality of interfaces of different standards to be compatible with a display output interface of the terminal device. When the terminal device is connected, the interaction interface generation module displays the interaction interface on the local display device of the terminal device. The triggerable function keys are provided on the interaction interface, including the program display keys corresponding to the programs and the screen display key, and the programs are the programs currently running on the terminal device. When the command of the display key of the target program triggered by the user is received, the to-be-projected data generated by the target program on the terminal device is obtained through the to-be-projected data obtaining module, and the to-be-projected data sent by the terminal device is received through the first transmission module. The to-be-projected data is transmitted to the extended display device through the second transmission module, whereby the extended display device performs the screen projection on the to-be-projected data. The to-be-projected data is generated only based on content of the target program and transmitted to the extended display device for screen projection, without a need to perform the screen projection on an entire screen and all programs of the local display device, achieving selection of projected content and protecting user privacy in the same physical location or network environment. In addition, the screen projection data is transmitted between the terminal device and the extended display device through the independent wireless auxiliary stream device, and there is no need to establish a direct connection between the terminal device and the extended display device, making it simple to deploy the solution. In addition, the screen projection data is transmitted between the wireless auxiliary stream device and the extended display device through a wireless connection. The screen projection data is transmitted through a wireless network of the wireless auxiliary stream device, and the transmission process does not need to rely entirely on a network resource of the terminal device or the extended display device, thereby optimizing deployment of network resources and improving convenience of the screen projection solution.

BRIEF DESCRIPTION OF THE DRAWINGS

To describe the technical solutions in the present disclosure more clearly, the following briefly introduces the accompanying drawings required for describing the present disclosure. Apparently, the accompanying drawings in the following description show merely some embodiments of the present disclosure, and those of ordinary skill in the art may still derive other drawings from these accompanying drawings without creative efforts.

FIG. 1 is a schematic diagram of a connection relationship of a first screen projection system according to an embodiment of the present disclosure;

FIG. 2 is a schematic diagram of a connection relationship of a second screen projection system according to an embodiment of the present disclosure;

FIG. 3 is a schematic diagram of a frame structure of a first wireless auxiliary stream device according to an embodiment of the present disclosure;

FIG. 9 is a step flowchart of a screen projection method based on a wireless auxiliary stream device according to an embodiment of the present disclosure;

FIG. 10 is a step flowchart of a first method of generating to-be-projected image data according to an example embodiment of the present disclosure;

FIG. 17 is a step flowchart of pairing a wireless auxiliary stream device and an extended display device according to an embodiment of the present disclosure;

DETAILED DESCRIPTION

Figure 4:
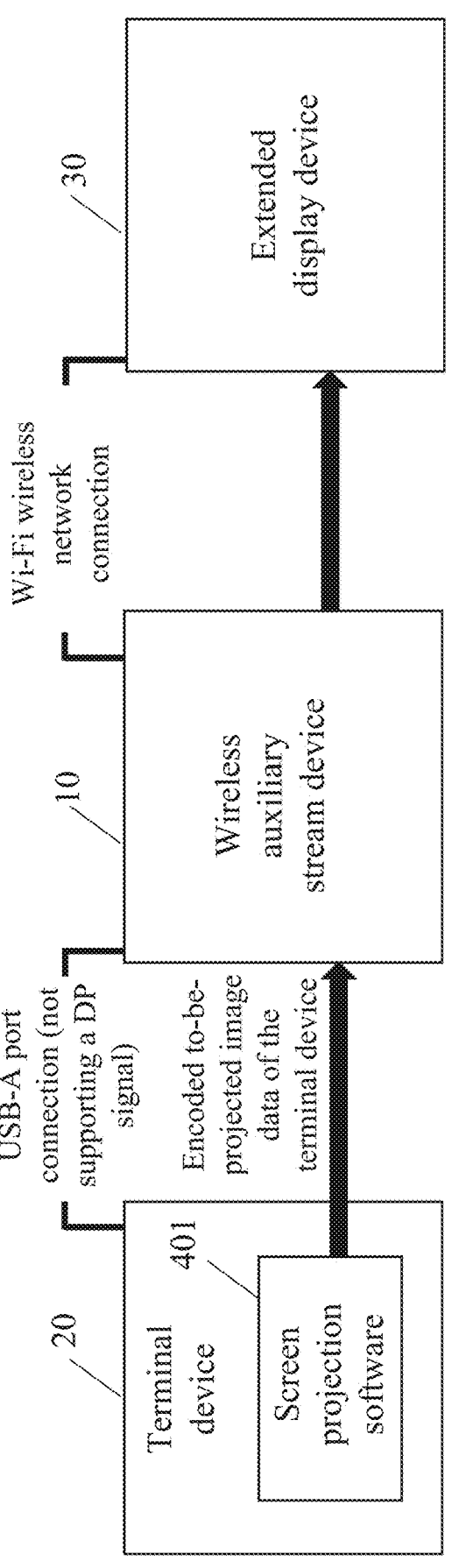
FIG. 4 is a schematic structural diagram of an encoding process of a first type of to-be-projected image data according to an example embodiment of the present disclosure.

To make the above objectives, features, and advantages of the present disclosure more obvious and easy to understand, the present disclosure will be further described in detail with reference to the accompanying drawings and specific implementations. Apparently, the described embodiments are some rather than all of the embodiments of the present disclosure. All other embodiments obtained by those of ordinary skill in the art based on the embodiments of the present disclosure without creative efforts should fall within the protection scope of the present disclosure.

FIG. 1 is a schematic diagram of a connection relationship of a first screen projection system according to an embodiment of the present disclosure. In an actual screen projection application scenario, a wireless auxiliary stream device 10, a terminal device 20, and an extended display device 30 constitute a screen projection system. The wireless auxiliary stream device is in the same physical location or network environment as the terminal device and the extended display device, such as in the same conference room or the same LAN. The wireless auxiliary stream device, the terminal device, and the extended display device constitute a screen projection system. The wireless auxiliary stream device 10 is a standalone device with a hardware structure and is not integrated into the terminal device 20. The wireless auxiliary stream device 10 has a first transmission module. The first transmission module may be a physical interface, and the wireless auxiliary stream device 10 can be connected to the terminal device 20 or the extended display device 30 through the physical interface in a wired manner. Specifically, as shown in FIG. 1, as a to-be-projected device, the terminal device 20 is also connected to a local display device 201. Preferably, the terminal device may be a computer host, and the local display device may be a display of the computer host; the terminal device may be a laptop, and the local display device may be a display of the laptop; or the terminal device may be a video conference host, and the local display device may be a display connected to the video conference host or a video conference host integrated with the display, such as a display in an intelligent conference tablet (IWB). The extended display device serves as a screen projection display device. Preferably, as shown in FIG. 1, the extended display device 30 may be a host device, and can be connected to a display device 40. The extended display device may be a video conference host, and the display device is a display of the video conference host, or the extended display device and the display may be integrated as a whole, such as an integrated intelligent conference tablet (IWB). The wireless auxiliary stream device 10 also has a second transmission module, and the second transmission module may be a wireless transmission module. After the wireless auxiliary stream device 10 and the extended display device 30 perform information pairing, the wireless auxiliary stream device 10 can establish a wireless connection to the extended display device 30 through the wireless transmission module.

When screen projection is required, the terminal device 20 is connected to the wireless auxiliary stream device 10 in the wired manner. The terminal device 20 generates to-be-projected data and transmits the to-be-projected data to the wireless auxiliary stream device 10 through the physical interface. At this time, the data is transmitted to the wireless auxiliary stream device 10 by a network resource of the terminal device 20. The wireless auxiliary stream device 10 has a wireless transmission module. During the screen projection, the wireless auxiliary stream device 10 and the extended display device 30 can be connected through the wireless transmission module. The wireless auxiliary stream device 10 sends the to-be-projected data to the extended display device 30 through the wireless transmission module to perform the screen projection. In this case, the data is transmitted to the extended display device 30 by a network resource of the wireless auxiliary stream device 10, and there is no need to establish a direct connection between the terminal device 20 and the extended display device 30. This saves the network resource of the terminal device 20 and fully leverages a functional advantage of the wireless auxiliary stream device 10. When a user annotates screen projection data on the extended display device 30 and needs to perform the screen projection of annotated to-be-projected data, the annotated to-be-projected data can also be sent from the extended display device 30 to the wireless auxiliary stream device 10 through the wireless transmission module of the wireless auxiliary stream device 10, and finally transmitted to the terminal device 20 through the wireless auxiliary stream device 10 to perform the screen projection. In this way, the wireless auxiliary stream device 10 partially bears a network resource consumption of data transmission, thereby saving a network resource of the extended display device, and achieving an optimal resource configuration of the screen projection system.

Additionally, in an actual screen projection application scenario, there may be one or more the wireless auxiliary stream devices in the screen projection system. For example, FIG. 2 is a schematic diagram of a connection relationship of a second screen projection system according to an embodiment of the present disclosure. When a distance between the terminal device 10 and the extended display device 30 exceeds a data transmission range of the wireless auxiliary stream device 10 connected to the terminal device, the screen projection system may include two wireless auxiliary stream devices (which are respectively described as a first wireless auxiliary stream device 101 and a second wireless auxiliary stream device 102). The first wireless auxiliary stream device 101 is connected to the terminal device 20 in the wired manner, and the second wireless auxiliary stream device 102 is connected to the extended display device 30 in the wired manner. The first wireless auxiliary stream device 101 and the second wireless auxiliary stream device 102 each have a wireless transmission module. A connection is established between the first wireless auxiliary stream device 101 and the second wireless auxiliary stream device 102 through the wireless transmission module. The terminal device 20 sends the to-be-projected data to the first wireless auxiliary stream device 101, and the first wireless auxiliary stream device 101 sends the to-be-projected data to the second wireless auxiliary stream device 102 through the wireless transmission module. The second wireless auxiliary stream device 102 receives and sends the to-be-projected data to the extended display device 30, whereby the screen projection is finally performed on the extended display device 30. In this way, screen projection data is mutually transmitted between the terminal device and the extended display device when the terminal device is far away from the extended display device. There is no need to establish the direct connection between the terminal device and the extended display device. A wireless transmission module of the wireless auxiliary stream device partially bears a network resource consumption of transmitting the to-be-projected data. This reduces the respective network resources of the terminal device and the extended display device, and optimizes a screen projection scheme.

Embodiment 1

This embodiment of the present disclosure provides a wireless auxiliary stream device. The wireless auxiliary stream device is connected to both a terminal device and an extended display device. The wireless auxiliary stream device is in the same physical location or network environment as the terminal device and the extended display device, such as in the same conference room or the same LAN. The wireless auxiliary stream device, the terminal device, and the extended display device constitute a screen projection system. FIG. 3 is a schematic diagram of a frame structure of a first wireless auxiliary stream device according to an embodiment of the present disclosure. The wireless auxiliary stream device 10 includes a first transmission module 301 and a second transmission module 302. The first transmission module 301 is configured to establish a first connection between the wireless auxiliary stream device 10 and the terminal device 20. The second transmission module 302 is configured to establish a second connection between the wireless auxiliary stream device 10 and the extended display device 30.

The wireless auxiliary stream device can establish the first connection to the terminal device through the first transmission module in a wired or wireless manner, thereby achieving data transmission between the wireless auxiliary stream device and the terminal device. The wireless auxiliary stream device can establish the second connection to the extended display device through the second transmission module in the wired or wireless manner, thereby achieving data transmission between the wireless auxiliary stream device and the extended display device. The terminal device and the extended display device are not connected to each other. Therefore, the wireless auxiliary stream device can receive to-be-projected data sent by the terminal device and send the received to-be-projected data to the extended display device to display the to-be-projected data, thereby achieving screen projection of content of the terminal device. In addition, after a user annotates and modifies the to-be-projected data on the extended display device, annotated and modified to-be-projected data can also be sent to the wireless auxiliary stream device and then sent to the terminal device through the wireless auxiliary stream device to complete the screen projection. The wireless auxiliary stream device is connected to the extended display device, the terminal device does not need to be connected to the extended display device, and the wireless auxiliary stream device can be connected to the terminal device through a standard unified interface. Therefore, the wireless auxiliary stream device does not need to be equipped with a plurality of interfaces of different standards to be compatible with a display output interface of the terminal device.

In an implementation example, the first transmission module 301 is a wired transmission module of a USB interface, and the second transmission module 302 is a wireless transmission module. Referring to FIG. 1, in this embodiment, the wireless auxiliary stream device 10 establishes the first connection to the terminal device through the wired transmission module of the USB interface in the wired manner, thereby achieving the data transmission between the wireless auxiliary stream device 10 and the terminal device 20. The wireless auxiliary stream device 10 can establish the second connection to the extended display device 30 through the wireless transmission module in the wireless manner, thereby achieving the data transmission between the wireless auxiliary stream device and the extended display device. Preferably, a wireless transmission method adopted by the wireless transmission module may be wireless fidelity (Wi-Fi) transmission, Bluetooth transmission, or the like.

In an implementation example, when a distance between the terminal device and the extended display device exceeds a data transmission range of the wireless auxiliary stream device connected to the terminal device, a screen projection system may include a plurality of wireless auxiliary stream devices to achieve the screen projection of the terminal device.

Referring to FIG. 2, in this embodiment, the screen projection system includes two wireless auxiliary stream devices. A first wireless auxiliary stream device 101 establishes the first connection to the terminal device 20 through the wired transmission module of the USB interface in the wired manner, thereby achieving data transmission between the first wireless auxiliary stream device 101 and the terminal device 20. A second wireless auxiliary stream device 102 establishes the second connection to the extended display device 30 through the wired transmission module of the USB interface in the wired manner, thereby achieving data transmission between the second wireless auxiliary stream device 102 and the extended display device 30. Moreover, data transmission is carried out between the first wireless auxiliary stream device 101 and the second wireless auxiliary stream device 102 through a wireless connection. In this way, the first wireless auxiliary stream device 101 can send the to-be-projected data sent by the terminal device to the second wireless auxiliary stream device 102 through wireless transmission. Then, the second wireless auxiliary stream device 102 sends the received to-be-projected data to the extended display device 30 to display the to-be-projected data, thereby realizing the screen projection of the content of the terminal device.

The two wireless auxiliary stream devices are disposed between the terminal device and the extended display device in the screen projection system for data transmission. Therefore, the extended display device is no longer limited to the data transmission range of the wireless auxiliary stream device connected to the terminal device when receiving the to-be-projected data sent by the wireless auxiliary stream device connected to the terminal device. Within data transmission ranges of the first wireless auxiliary stream device connected to the terminal device and the second wireless auxiliary stream device connected to the extended display device, the extended display device can always receive the to-be-projected data through the second wireless auxiliary stream device, and the extended display device does not need to be in a same and small-ranged conference scenario with the terminal device at the same time, but in a wider-ranged one within the same network environment, such as under the same LAN.

Referring to FIG. 3, the wireless auxiliary stream device further includes an interaction interface display module 303, a to-be-projected data obtaining module 304, and the second transmission module 302. The interaction interface generation module 303 is configured to display an interaction interface on a local display device 201 of the terminal device 20 when the terminal device 20 is connected. A plurality of triggerable function keys are provided on the interaction interface, the function keys include program display keys corresponding to a plurality of programs and a screen display key, and the programs are programs currently running on the terminal device.

The to-be-projected data obtaining module 304 is configured to: when a command of a display key of a target program triggered by the user is received, obtain to-be-projected data of the target program generated on the terminal device 20, and receive, through the first transmission module 301, the to-be-projected data sent by the terminal device 20.

The second transmission module 302 is configured to transmit the to-be-projected data to the extended display device 30, whereby the extended display device 30 performs the screen projection on the to-be-projected data.

Specifically, when the wireless auxiliary stream device 10 is connected to the terminal device 20 through the first transmission module 301, the terminal device 20 recognizes that the wireless auxiliary stream device 10 is connected. The local display device 201 of the terminal device 20 automatically pops up and displays the interaction interface generated by the interaction interface generation module 303. The triggerable function keys are provided on the interaction interface, including the program display keys corresponding to the programs and the screen display key. The programs are the programs currently running on the terminal device.

The program display keys respectively correspond to program images displayed on a desktop of the terminal device 20, and the screen display key corresponds to a full-screen image of the desktop of the terminal device 20. Preferably, the program display keys and the screen display key may be displayed on the interaction interface in a form of a miniature image of program interfaces corresponding to the keys and the desktop of the terminal device 20, or in a form of a program icon and a text name that correspond to each key, such as "program A", "program B", and "desktop". The target program is a program corresponding to a to-be-projected function key that the user selects on the interaction interface. In this embodiment of the present disclosure, the user may select only one program display key at a time as one target program for the screen projection, or select a plurality of program display keys as target programs for the screen projection.

Preferably, the function keys on the interaction interface also include a selection key for screen projection quality and a function selection key for whether the screen projection is automatically performed when the wireless auxiliary stream device 10 is inserted next time. The user can adjust display quality of a picture on the extended display device 30 through the selection key for screen projection quality. The adjustment of the display quality may be adjustment of resolution of the displayed picture. If a physical key or a touch key is disposed on the wireless auxiliary stream device 10, pop-up of the interaction interface can be controlled through the physical key or the touch key to trigger a screen projection function of the wireless auxiliary stream device 10.

Preferably, in addition to being triggered by the key, the interaction interface can also be triggered to pop up through a gesture operation of the user, thereby triggering the screen projection function of the wireless auxiliary stream device 10. Specifically, the wireless auxiliary stream device 10 or the terminal device 20 is provided with a gesture recognition control. After the wireless auxiliary stream device 10 is connected to the terminal device 20, the interaction interface is displayed on the local display device 201 of the terminal device 20 when a target gesture of the user is recognized. For example, after the wireless auxiliary stream device 10 is connected to the terminal device 20, the interaction interface is displayed on the local display device 201 of the terminal device 20 when it is recognized that the user shakes his/her hand. Preferably, an external triggering device can also be disposed to trigger the screen projection function of the wireless auxiliary stream device after the wireless auxiliary stream device 10 is connected to the terminal device 20. Preferably, after the wireless auxiliary stream device 10 is connected to the terminal device 20, the screen projection function may be directly triggered, without an additional triggering operation such as key pressing or gesture control.

In the prior art, there is only one physical key on the wireless auxiliary stream device, which is not conducive to function expansion of the screen projection. For example, in the case of a good network condition, the user may choose higher screen projection quality. In the case of a poor network condition, the user may perform the screen projection by giving a priority to fluency. However, in the present disclosure, the function keys can be provided on the interaction interface to ensure the function expansion of the screen projection.

When the command of the display key of the target program triggered by the user is received, the to-be-projected data of the target program generated on the terminal device 20 is obtained by the to-be-projected data obtaining module 104. Specifically, the to-be-projected data is corresponding program data (including image data and/or audio data of the target program) obtained from the terminal device 20 based on the target program selected by the user, and is displayed on the extended display device 30. A plurality of methods can be used to locate and capture the program data of the target program. Due to different operating principles of the methods used, a final capture effect of the to-be-projected data may vary slightly.

After being obtained, the to-be-projected data is transmitted to the extended display device 30 through the second transmission module 302, whereby the extended display device 30 performs the screen projection on the to-be-projected data. The to-be-projected data is generated based on only the program data of the target program and transmitted to the extended display device 30 for the screen projection, without a need to perform the screen projection on an entire screen and all programs of the local display device 201, achieving selection of projected content and protecting user privacy.

Figure 18:
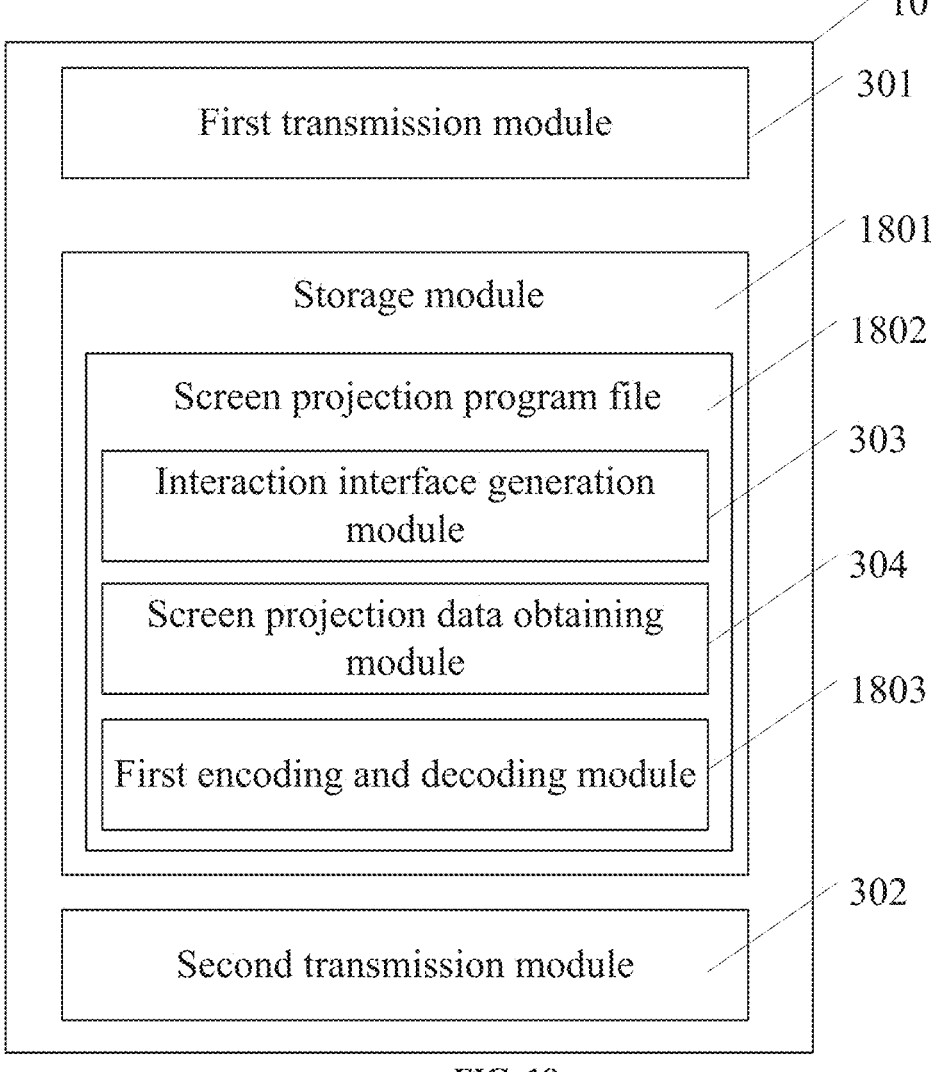
FIG. 18 is a schematic diagram of a frame structure of a second wireless auxiliary stream device according to an embodiment of the present disclosure.

FIG. 18 is a schematic diagram of a frame structure of a second wireless auxiliary stream device according to an embodiment of the present disclosure. To fully utilize performance of the terminal device 20 and reduce a computational burden of the wireless auxiliary stream device 10, the wireless auxiliary stream device 10 further includes: a storage module 1801 configured to store a screen projection program file 1802, and transmit the screen projection program file to the terminal device 20 through the first transmission module 301 when the terminal device 20 is connected, whereby the terminal device 20 installs the screen projection program file 1802. The screen projection program file 1802 includes the interaction interface generation module 303 and the to-be-projected data obtaining module 304.

After being connected to the terminal device 20 through the first transmission module 301, the wireless auxiliary stream device 10 transmits the screen projection program file 1802 stored in the storage module 1801 to the terminal device 20 through the first transmission module 301, whereby the terminal device 30 downloads and installs a screen projection program corresponding to the screen projection program file 1802, in other words, screen projection software. The screen projection software is used to implement functions of the interaction interface generation module 303 and the to-be-projected data obtaining module 304. Afterwards, the terminal device 20 correspondingly starts a background program of the screen projection software to detect the wireless auxiliary stream device 10, and automatically starts the screen projection software to generate the interaction interface after discovering that the wireless auxiliary stream device 10 is connected. The screen projection program file 1802 includes the interaction interface generation module 303 and the to-be-projected data obtaining module 304. Therefore, after the user triggers the screen projection, the screen projection program installed on the terminal device 20 executes operations of generating the interaction interface and obtaining the to-be-projected data of the target program generated on the terminal device 20. This fully utilizes the performance of the terminal device and reduces the computational burden of the wireless auxiliary stream device.

Specifically, when the wireless auxiliary stream device 10 is connected to the terminal device 20 through the first transmission module 301, the terminal device 20 recognizes that the wireless auxiliary stream device 10 is connected, and the local display device 201 of the terminal device 20 automatically pops up the interaction interface generated by the screen projection program installed on the terminal device 20.

In this implementation example, a specific process of obtaining, through the to-be-projected data obtaining module 304, the to-be-projected data of the target program generated on the terminal device 20 when the command of the display key of the target program triggered by the user is received may be as follows: The screen projection program installed on the terminal device 20 collects the program data of the target program (such as window image and/or audio data of the target program) in the terminal device to obtain the to-be-projected data.

In an implementation example, the to-be-projected data includes image data and audio data.

Referring to FIG. 18, in an implementation example, when the to-be-projected data is the image data, in order to further reduce computational pressure of the wireless auxiliary stream device, the to-be-projected data can be encoded on the terminal device 20. The screen projection program file 1802 further includes a first encoding and decoding module 1803.

The first transmission module 301 is further configured to recognize whether a transmission port of the terminal device 20 connected to the wireless auxiliary stream device 10 supports a preset communication protocol.

The first encoding and decoding module 1803 is configured to perform first encoding on the to-be-projected data when it is recognized that the transmission port of the terminal device 20 does not support the preset communication protocol.

The first transmission module 301 is further configured to receive firstly encoded to-be-projected data sent by the terminal device 20.

The second transmission module 302 is further configured to transmit the firstly encoded to-be-projected data to the extended display device 30, whereby the extended display device 30 performs the screen projection on the firstly encoded to-be-projected data after decoding the firstly encoded to-be-projected data.

Specifically, after the wireless auxiliary stream device 10 is connected to the terminal device 20, the first transmission module 301 recognizes whether the transmission port of the terminal device 20 connected to the wireless auxiliary stream device 10 supports the preset communication protocol. Preferably, the preset communication protocol may be a DP signal transmission protocol. Specifically, a DP signal is a digital video interface standard developed by an alliance of personal computer (PC) and chip manufacturers and standardized by the Video Electronics Standards Association (VESA). The digital video interface standard is mainly used for connecting a video source, a display, and the like, and also supports data of audio, USB, and other forms.

When it is recognized that the transmission port of the terminal device 20 does not support the preset communication protocol, the to-be-projected data needs to be encoded on the terminal device 20. The screen projection program file 1802 further includes the first encoding and decoding module 1803. When the screen projection software corresponding to the screen projection program file 1802 is installed on the terminal device 20, the screen projection software also includes interaction software that implements the function of the first encoding and decoding module 1803.

Specifically, when it is recognized that the transmission port of the terminal device 20 does not support the preset communication protocol, the first encoding and decoding module 1803, namely the interaction software, performs the first encoding on the to-be-projected data to encode the to-be-projected data on the terminal device. After the interaction software in the screen projection software installed on the terminal device 20 encodes the to-be-projected data, the wireless auxiliary stream device 10 receives, through the first transmission module 301, the firstly encoded to-be-projected data sent by the terminal device 20. The wireless auxiliary stream device 10 transmits the firstly encoded to-be-projected data to the extended display device 30 through the second transmission module 302, whereby the extended display device 30 decodes and displays the firstly encoded to-be-projected data. Preferably, a format of the to-be-projected data obtained after the first encoding includes but is not limited to H.264/H.265 and MJPEG formats, depending on an auxiliary stream input format supported by the extended display device. Performing the encoding process of the to-be-projected data on the terminal device through a software program, not only ensures data security through encoding, but also reduces the workload of the development of the wireless auxiliary stream device and avoids the financial cost of configuring additional hardware module for encoding.

In an implementation solution of this implementation example, FIG. 4 is a schematic structural diagram of an encoding process of a first type of to-be-projected image data according to an example embodiment of the present disclosure. When the to-be-projected data is the image data, the first transmission module is a USB port, the transmission port of the terminal device connected to the first transmission module is also a USB port, such as a USB-A port shown in FIG. 4, the second transmission module is a wireless network transmission module using Wi-Fi, and the preset communication protocol is the DP signal transmission protocol, a specific process of completing the first encoding for the to-be-projected data on the terminal device is as follows:

When it is recognized that the USB-A port of the terminal device 20 does not support the DP signal, the wireless auxiliary stream device 10 is enumerated as a CD drive. When recognizing that the wireless auxiliary stream device 10 is the CD drive, the terminal device 20 runs the screen projection software 401 that corresponds to the screen projection program file and is downloaded and installed from the wireless auxiliary stream device 10. After the user triggers a screen projection operation, a screen projection notification is reported to the screen projection software 401 of the terminal device 20. The screen projection software 401 collects the program data of the target program (such as the window image and/or audio data of the target program) in the terminal device to obtain the to-be-projected data. Afterwards, the interaction software included in the screen projection software 401 installed on the terminal device 20 performs the first encoding on the to-be-projected data, and transmits the to-be-projected data obtained after the first encoding to the wireless auxiliary stream device 10 through the USB-A port. The wireless auxiliary stream device 10 then transmits the to-be-projected data to the extended display device 30 through the second transmission module, whereby the extended display device decodes and displays the to-be-projected data. Preferably, when the wireless auxiliary stream device performs wireless communication with the extended display device through the second transmission module, the wireless communication may adopt the User Datagram Protocol (UDP) or the Transmission Control Protocol (TCP) as a transport layer protocol.

Figure 19:
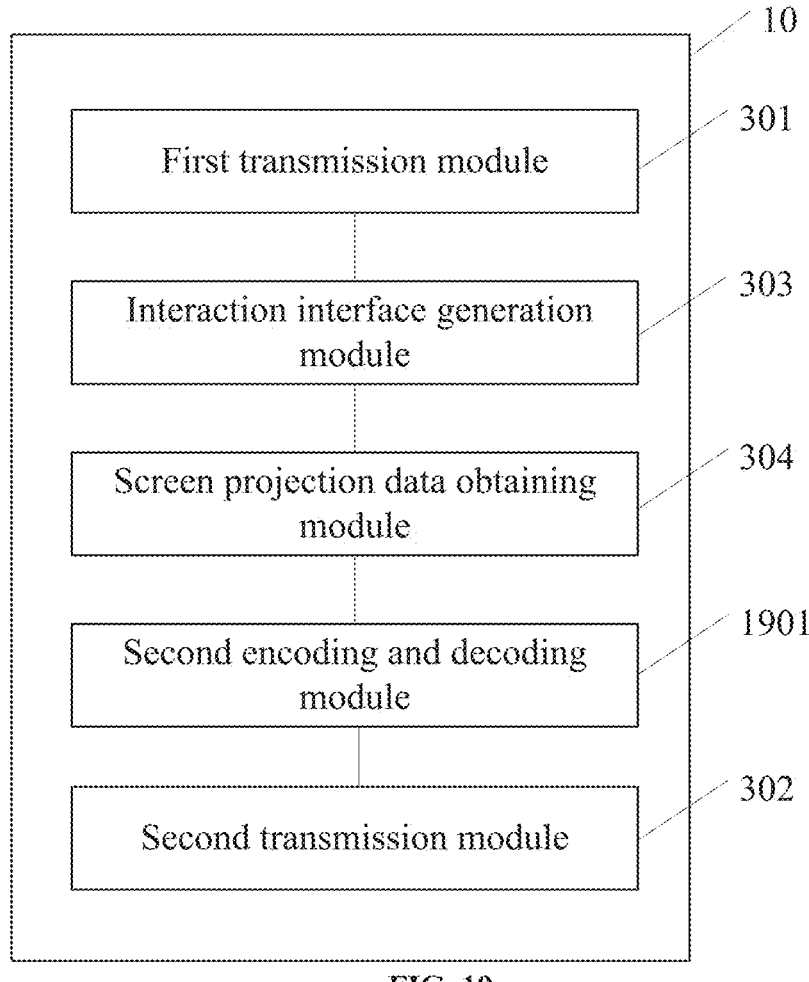
FIG. 19 is a schematic diagram of a frame structure of a third wireless auxiliary stream device according to an embodiment of the present disclosure.

FIG. 19 is a schematic structural diagram of an encoding process of a third type of to-be-projected image data according to an example embodiment of the present disclosure. When the to-be-projected data is the image data, if the terminal device supports outputting the to-be-projected data of the preset communication protocol, the to-be-projected data can be encoded on the wireless auxiliary stream device 10. The wireless auxiliary stream device 10 further includes a second encoding and decoding module 1901.

The first transmission module 301 is further configured to recognize whether the transmission port of the terminal device 20 connected to the wireless auxiliary stream device 10 supports the preset communication protocol.

The second encoding and decoding module 1901 is configured to: when it is recognized that the transmission port of the terminal device 20 supports the preset communication protocol, perform second encoding on the to-be-projected data after receiving the to-be-projected data sent by the terminal device 20.

The second transmission module 302 is further configured to transmit secondly encoded to-be-projected data to the extended display device 30, whereby the extended display device 30 performs the screen projection on the secondly encoded to-be-projected data after decoding the secondly encoded to-be-projected data.

Specifically, after the wireless auxiliary stream device 10 is connected to the terminal device 20, the first transmission module 301 recognizes whether the transmission port of the terminal device 20 connected to the wireless auxiliary stream device 10 supports the preset communication protocol. Preferably, the preset communication protocol may be the DP signal transmission protocol.

When it is recognized that the transmission port of the terminal device 20 supports the preset communication protocol, the to-be-projected data can be encoded in the second encoding and decoding module 1901 of the wireless auxiliary stream device 10. Specifically, the second encoding and decoding module 1901 is a module with a hardware structure in the wireless auxiliary stream device 10. When it is recognized that the transmission port of the terminal device 20 supports the preset communication protocol, the to-be-projected data sent by the terminal device 20 is received through the first transmission module 301, and the second encoding is performed on the to-be-projected data through the second encoding and decoding module 1901. The wireless auxiliary stream device 10 transmits secondly encoded to-be-projected data to the extended display device 30 through the second transmission module 302, whereby the extended display device decodes and displays the secondly encoded to-be-projected data. Preferably, a format of the secondly encoded to-be-projected data depends on the auxiliary stream input format supported by the extended display device 30. Performing the encoding process of the to-be-projected data on the terminal device through a hardware solution, not only ensures data security through encoding, but also reduces the data processing pressure of the terminal device since there is no need to divide the resources of the terminal device for data encoding processing, reducing the dependence on the resources of the terminal device.

Figure 5:
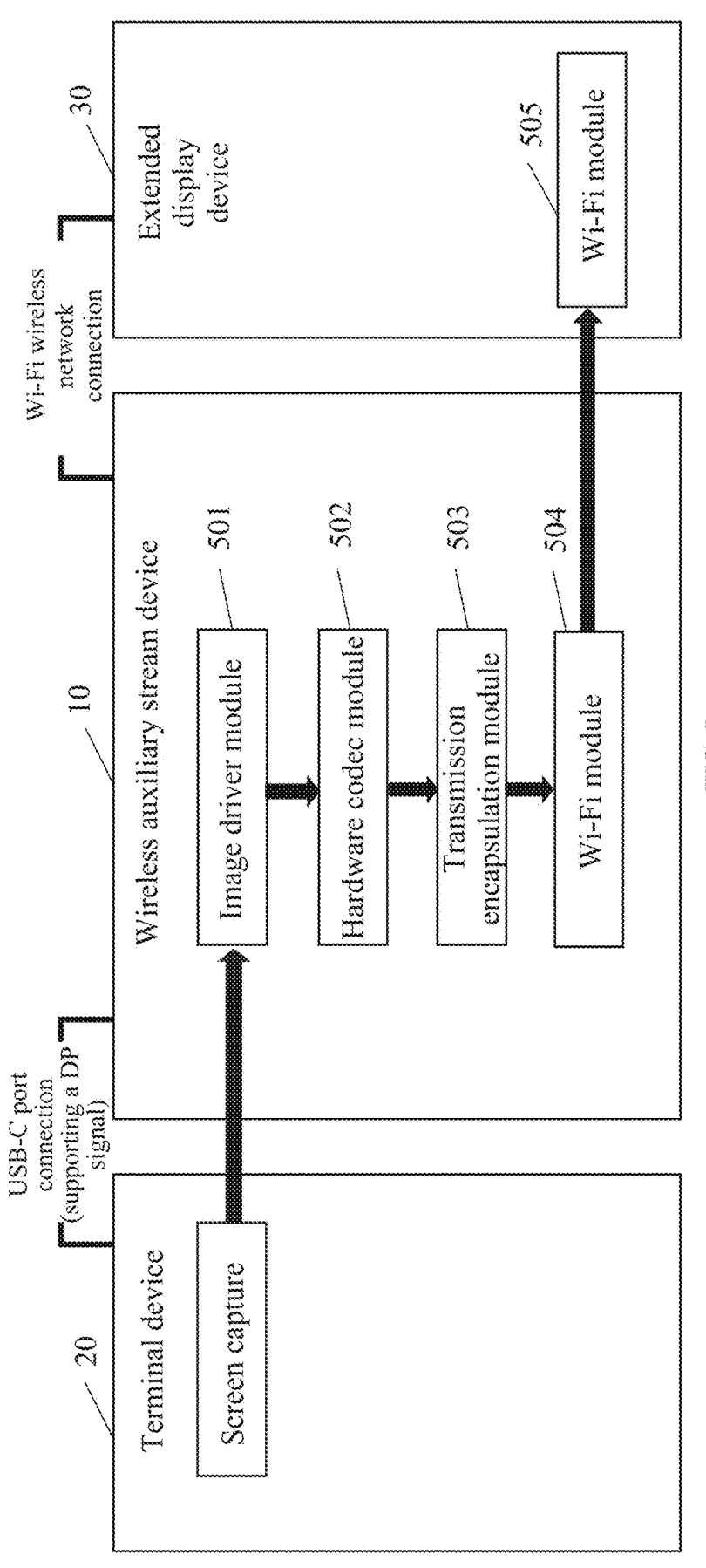
FIG. 5 is a schematic structural diagram of an encoding process of a second type of to-be-projected image data according to an example embodiment of the present disclosure.

In an implementation solution of this implementation example, FIG. 5 is a schematic structural diagram of an encoding process of a second type of to-be-projected image data according to an example embodiment of the present disclosure. When the to-be-projected data is the image data and it is recognized that the transmission port of the terminal device 20 supports the preset communication protocol, the to-be-projected image data generated on the terminal device 20 can be encoded in the second encoding and decoding module 1901 of the wireless auxiliary stream device 10 after being obtained through an image driver module 501. The second encoding and decoding module 1901 is a module with a hardware structure in the wireless auxiliary stream device 10, including a hardware codec module 502 and a transmission encapsulation module 503.

Referring to FIG. 5, when the first transmission module 301 is the USB port, the transmission port of the terminal device 20 connected to the first transmission module 301 is also the USB port, such as a USB-C port shown in FIG. 5, the second transmission module 302 is a Wi-Fi module, and the preset communication protocol is the DP signal transmission protocol, if the to-be-projected data is the image data, a specific process of completing the second encoding for the to-be-projected image data on the wireless auxiliary stream device 10 is as follows:

When it is recognized that the USB-C port of the terminal device 20 supports the DP signal, the wireless auxiliary stream device 10 receives, through the first transmission module 301, the to-be-projected image data that is sent by the terminal device 20 and obtained through screen capture by the screen projection software. Firstly, the to-be-projected image data is collected by the image driver module 501 of the wireless auxiliary stream device 10. The hardware codec module 502 reads the to-be-projected image data from the image driver module 501 and performs the second encoding on the to-be-projected image data. Secondly encoded to-be-projected image data is then transmitted to the transmission encapsulation module 503 in the second encoding and decoding module 1901 for packaging and encapsulation. Packaged and encapsulated data is transmitted to a Wi-Fi module 505 of the extended display device 30 through a Wi-Fi module 504 of the wireless auxiliary stream device 10 via a Wi-Fi wireless network. The extended display device 30 performs the screen projection the secondly encoded received to-be-projected data after decoding the secondly encoded to-be-projected data. Specifically, the secondly encoded to-be-projected data is sent to the air by the Wi-Fi module 504 of the wireless auxiliary stream device 10, and received and decoded by the Wi-Fi module 505 of the extended display device 30. Through a High-Definition Multimedia Interface (HDMI) interface, the decoded to-be-projected data is connected to a display screen connected to the extended display device 30 for displaying.

The transmission encapsulation module 503 is further configured to confirm an encoder parameter setting interface and an encoded-data transmission interface with the hardware codec module 502, confirm extraction, splitting, and packaging of encoded data in an interaction process of the encoded data, verify a function of packaging and encapsulating the encoded data, and confirm a response status such as image quality, a delay, and a frame rate of the to-be-projected image data in a weak network.

Figure 20:
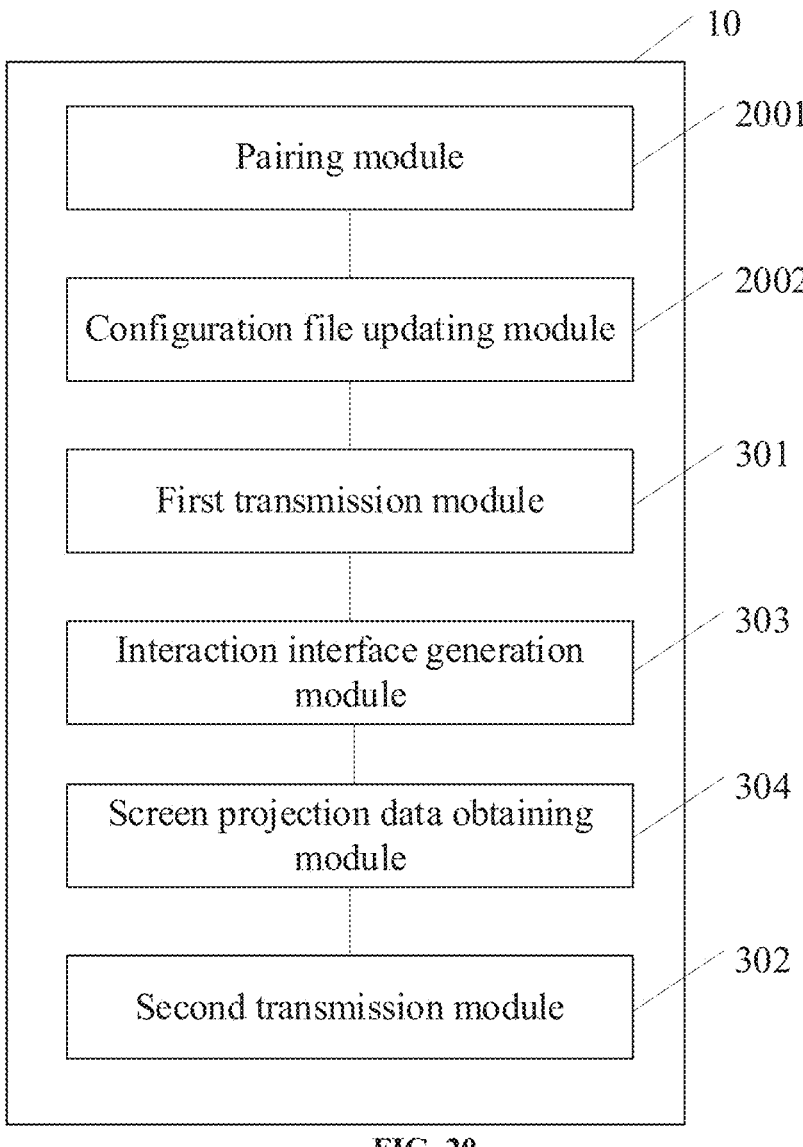
FIG. 20 is a schematic diagram of a frame structure of a fourth wireless auxiliary stream device according to an embodiment of the present disclosure.

FIG. 20 is a schematic diagram of a frame structure of a fourth wireless auxiliary stream device according to an embodiment of the present disclosure. When the wireless auxiliary stream device 10 is used for the first time to achieve the screen projection between the terminal device 20 and the extended display device 30, that is, when the wireless auxiliary stream device 10 is connected to the extended display device 30 and/or the terminal device 20 for the first time, the wireless auxiliary stream device 10 also needs to be paired with the extended display device 30. Therefore, the wireless auxiliary stream device 10 further includes a pairing module 2001 and a configuration file updating module 2002.

The first transmission module 301 is further configured to: before the terminal device 20 is connected, establish a third connection to the extended display device 30 when the extended display device 30 is connected.

Specifically, when performing device pairing with the extended display device 30, the wireless auxiliary stream device 10 does not need to connect to the terminal device 20. In a device pairing process, the wireless auxiliary stream device 10 needs to establish a wired connection to the extended display device 30. Therefore, before being connected to the terminal device 20, the wireless auxiliary stream device 10 is connected to the extended display device 30 through the first transmission module 301. In this case, the wireless auxiliary stream device 10 establishes the third connection to the extended display device 30. Specifically, when the first transmission module is the USB port, the third connection established between the wireless auxiliary stream device 10 and the extended display device 30 is a wired connection established through the USB port.

The second transmission module 302 is further configured to establish a fourth connection to the extended display device 30 when the third connection to the extended display device 30 is established, recognize a scenario of connecting the extended display device 30, and interrupt the fourth connection to the extended display device 30 when recognizing a scenario of pairing with the extended display device 30.

Specifically, in order to meet a need for faster screen projection, after being powered on and started, the wireless auxiliary stream device 10 often sets to first perform a connection to the to-be-paired extended display device 30 automatically through the second transmission module 302, namely the fourth connection established to the extended display device 30. When the wireless auxiliary stream device 10 performs the device pairing with the to-be-paired extended display device 30, in order to avoid a pairing failure due to an inability to normally transmit pairing information and update a pairing file between the wireless auxiliary stream device 10 and the to-be-paired extended display device 30, the to-be-paired extended display device 30 needs to be connected through the first transmission module 301 of the wireless auxiliary stream device 10.

Therefore, the wireless auxiliary stream device 10 must interrupt the fourth connection established between the second transmission module 302 and the to-be-paired extended display device 30. Therefore, the second transmission module 302 is further configured to recognize the scenario of connecting the extended display device 30, and interrupt the fourth connection to the extended display device 30 when recognizing the scenario of pairing with the extended display device 30.

The pairing module 2001 is configured to: before the terminal device 20 is connected, in the scenario of pairing with the extended display device 30, reset an enumerated device type to a preset device type, and perform enumeration to complete the pairing with the extended display device 30.

Specifically, the wireless auxiliary stream device 10 usually has a default enumerated device type when being connected to the extended display device 30. In the scenario of pairing with the to-be-paired extended display device 30, the default enumerated device type may not be paired with the to-be-paired extended display device, and the enumerated device type of the wireless auxiliary stream device 10 needs to be reset. Before the terminal device 20 is connected, in the scenario of pairing with the to-be-paired extended display device 30, the enumerated device type of the wireless auxiliary stream device 10 is reset to the preset device type through the pairing module 2001, and the enumeration is performed to complete the pairing with the to-be-paired extended display device 30. Preferably, the default enumerated device type may be set to a Human Interface Device (HID) or a bulk device. The preset device type may be set to the HID or an Ethernet Simulation Model (EEM) device. Specifically, the preset device type is enumerated as the EEM device to replace an existing HID communication protocol link. Specifically, the HID is a commonly used device type in Universal Serial Bus (USB) devices, such as a keyboard, a mouse, and other USB devices that directly interact with a human. EEM device: As a specification for efficiently transmitting an Ethernet frame at a low cost through a USB, an EEM treats the USB as a tool of a mobile Ethernet data packet and is used by a mobile device to communicate with a host by the Ethernet through the USB.

The configuration file updating module 2002 is configured to update a configuration file of the wireless auxiliary stream device 10 based on configuration information that is of the extended display device 30 and obtained in the pairing process, to complete the pairing.

Specifically, in a process of performing the enumeration to complete the pairing with the extended display device 30, the wireless auxiliary stream device 10 uses the first transmission module 301 to perform the enumeration starting from the preset device type to complete the pairing with the to-be-paired extended display device 30, and completes the pairing with and connection to the to-be-paired extended display device 30 until a device type corresponding to the to-be-paired extended display device 30 is enumerated. After the to-be-paired extended display device 30 is paired and connected, the configuration information of the to-be-paired extended display device 30 is obtained. The configuration file updating module 2002 updates the configuration file of the wireless auxiliary stream device 10 based on the obtained configuration information of the extended display device 30 to complete the pairing between the wireless auxiliary stream device 10 and the extended display device 30.

The first transmission module 301 is further configured to interrupt the third connection to the extended display device 30 after the pairing is completed.

Specifically, after the wireless auxiliary stream device 10 completes the pairing with the extended display device 30, the first transmission module 301 automatically interrupts the third connection to the extended display device 30.

The second transmission module 302 is further configured to: after the pairing is completed, establish the second connection to the extended display device 30 when the terminal device 20 is connected, to establish the data transmission between the wireless auxiliary stream device 10 and the extended display device 30.

Specifically, after the wireless auxiliary stream device 10 completes the pairing with the extended display device 30, parameters in the configuration file of the wireless auxiliary stream device 10 have been updated correspondingly based on the configuration information of the extended display device 30. When the first transmission module 301 is connected to the terminal device 20, the wireless auxiliary stream device 10 can directly establish the second connection to the extended display device 30 through the second transmission module 302, achieving the data transmission between the wireless auxiliary stream device 10 and the extended display device 30. When the wireless auxiliary stream device 10 is connected to the extended display device 30 for the first time, the wireless auxiliary stream device 10 performs the device pairing with the extended display device 30, and correspondingly updates the configuration file of the wireless auxiliary stream device 10 based on the configuration information of the extended display device 30 to configure the connected extended display device 30. The wireless auxiliary stream device 10 can establish a connection to the paired extended display device 30 directly through the second transmission module 302 to achieve fast connection establishment.

Figure 6:
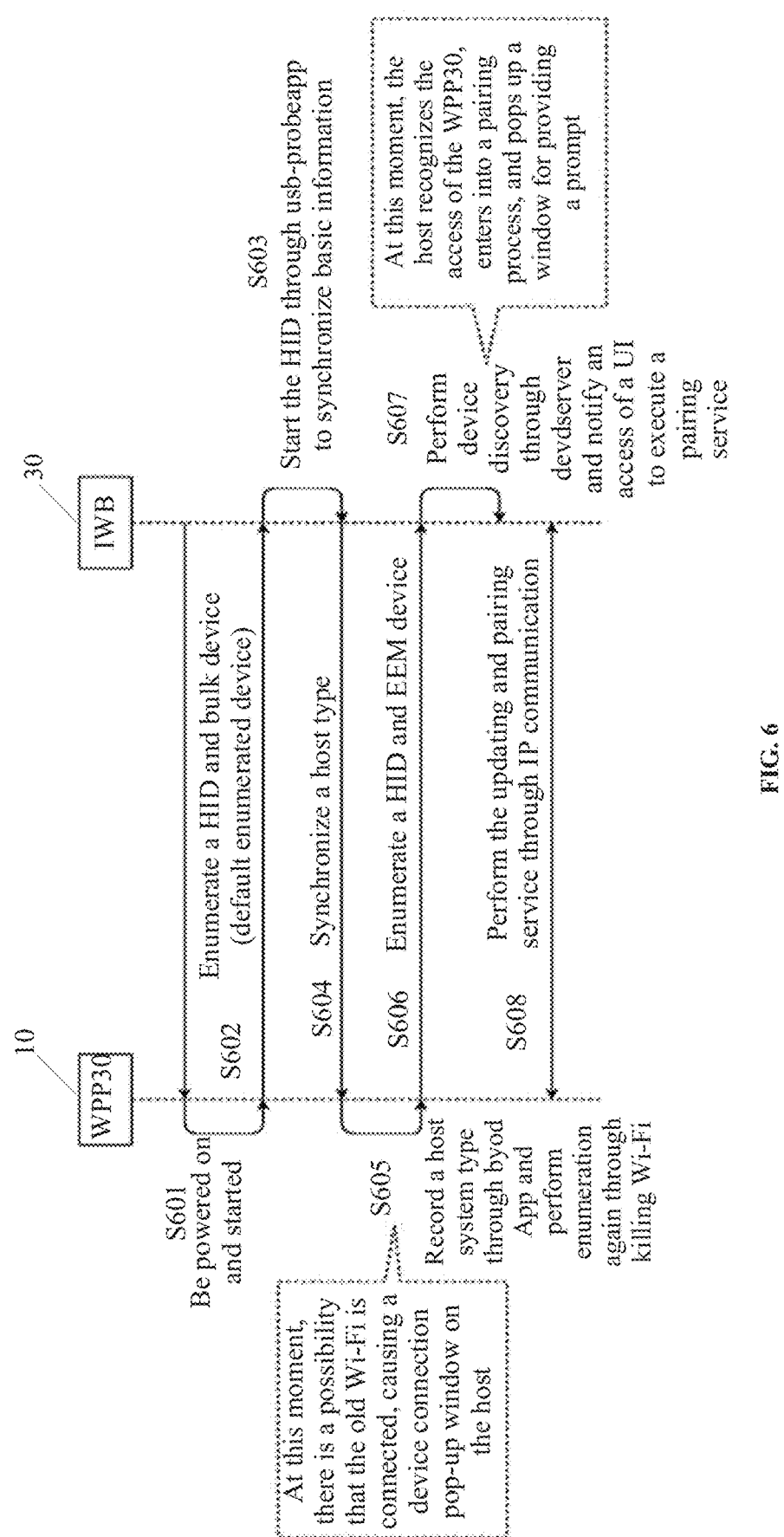
FIG. 6 is a schematic flowchart of pairing a wireless auxiliary stream device and an extended display device according to an example embodiment of the present disclosure.

In an implementation solution of this implementation example, FIG. 6 is a schematic flowchart of pairing the wireless auxiliary stream device and the extended display device according to an embodiment of the present disclosure. For example, the wireless auxiliary stream device 10 is a wireless screen projector with a model being WPP30, the extended display device 30 is an integrated intelligent conference tablet IWB host. When the first transmission module is the USB port and the second transmission module is the Wi-Fi module, the pairing between the wireless auxiliary stream device 10 and the extended display device 30 is specifically as follows:

Before being connected to the terminal device 20, the wireless auxiliary stream device 10 is connected to the extended display device 30 through the first transmission module 301. At this time, the wireless auxiliary stream device 10 establishes the wired connection to the extended display device 30 through the USB port. Specifically, when being connected to the wireless auxiliary stream device 10 through the USB port, the extended display device 30 can also power the wireless auxiliary stream device 10.

Specifically, the wireless auxiliary stream device WPP30 is plugged into the extended display device, namely the IWB host. The pairing between the wireless auxiliary stream device and the extended display device specifically includes following steps S601 to S606:

Step S601: The WPP30 is powered on and started.

Step S602: After being powered on and started, the WPP30 connects to the to-be-paired extended display device (the IWB host in FIG. 6) within a signal range by the default enumerated device type (such as the HID and bulk device).

Step S603: Through usb-probeapp of the USB port, the IWB host receives and recognizes information of the enumerated device type sent synchronously by the WPP30. In this case, because the IWB host does not support the enumerated device type of the WPP30, the IWB host cannot recognize any access of devices.

Step S604: The IWB host synchronizes host type information to the WPP30.

Step S605: The WPP30 receives and records the host type information through byod app. In this case, there is a certain probability that the WPP30 is connected to the IWB host through the second transmission module (for example, the Wi-Fi module) of the WPP30. As a result, the IWB host experiences a device Wi-Fi connection pop-up window, and the pairing process is interrupted. Therefore, "killing Wi-Fi" is set in the WPP30 to close a Wi-Fi connection between the WPP30 and the IWB host, and the WPP30 is enumerated again.

Step S606: The WPP30 resets the enumerated device type (such as the HID and EEM device) and is connected to the to-be-paired IWB host.

Step S607: The IWB host recognizes that a reset enumerated device type of the WPP30 is a device type supported by the IWB host, recognizes the access of the WPP30, enters into a pairing process with the WPP30, and provides a pairing-related pop-up prompt.

After the to-be-paired extended display device is paired and connected, the wireless auxiliary stream device obtains the configuration information of the to-be-paired extended display device through Internet Protocol (IP) communication. The configuration file updating module of the wireless auxiliary stream device updates the configuration file of the wireless auxiliary stream device based on the obtained configuration information of the extended display device to complete the pairing between the wireless auxiliary stream device and the to-be-paired extended display device.

Specifically, the pairing process may further include step S608: After the WPP30 and the IWB host are paired and connected, the configuration information of the IWB host is obtained through the IP communication, and the configuration file of the WPP30 is updated and upgraded based on the configuration information of the IWB host to complete the pairing between the WPP30 and the IWB host. Therefore, the second transmission module is further configured to recognize a scenario of connecting the wireless auxiliary stream device (namely the WPP30) and the to-be-paired extended display device (namely the IWB host), and interrupt the Wi-Fi connection to the to-be-paired extended display device when recognizing the scenario of pairing with the to-be-paired extended display device. Only the wired connection between the wireless auxiliary stream device and the to-be-paired extended display device is retained. Then, the enumerated device type is reset to the preset device type (such as the HID and EEM device) through the pairing module, and the enumeration is performed to complete the pairing with the to-be-paired extended display device.

In an implementation example, when being connected to a device (such as the terminal device and/or the extended display device) through the first transmission module, the wireless auxiliary stream device can receive power supplied by the connected device (such as the terminal device and/or the extended display device) to the wireless auxiliary stream device. For example, when the wireless auxiliary stream device (the WPP30) establishes the wired connection (such as the USB interface) to the extended display device (the IWB host) through the first transmission module for the pairing, the IWB host can power the WPP30 through the USB interface. In addition, because the wireless auxiliary stream device requires a certain amount of time to operate normally after being powered on, relying on the connected device to power the wireless auxiliary stream device may result in additional device startup time during the screen projection, affecting screen projection efficiency. Therefore, in order to improve the screen projection efficiency and enhance user experience, a power supply can be disposed on the wireless auxiliary stream device, allowing the wireless auxiliary stream device to start quickly and operate normally during the screen projection. This reduces overall running time of the screen projection system. The power supply disposed on the wireless auxiliary stream device may be a rechargeable battery or a disposable battery. Specifically, in a solution in which the power supply of the wireless auxiliary stream device is the rechargeable battery, an additional charging device can be disposed to charge the wireless auxiliary stream device. When the wireless auxiliary stream device is not in use, the charging device can be used to power the wireless auxiliary stream device in a timely manner. A power supply method includes but is not limited to magnetic induction charging and physical interface charging.

In an implementation example, when the to-be-projected data is the audio data, the to-be-projected data transmitted to the wireless auxiliary stream device 10 can be encoded according to following two methods:

In a first encoding method, after the wireless auxiliary stream device is connected to the terminal device, the screen projection software installed on the terminal device can collect sound of a local sound card of the terminal device to obtain the to-be-projected data. The wireless auxiliary stream device is enumerated as a UAC audio speaker (SPK) device through its core USB driver module to establish the connection to the terminal device to transmit the to-be-projected data. The terminal device does not encode the to-be-projected data and directly sends the to-be-projected data to the wireless auxiliary stream device. Through the first transmission module, the wireless auxiliary stream device receives the to-be-projected data sent by the terminal device. The wireless auxiliary stream device transmits the to-be-projected data to the extended display device through the second transmission module, whereby the extended display device plays the to-be-projected data.

In a second encoding method, if the terminal device supports outputting the to-be-projected data of the preset communication protocol, the to-be-projected data can be encoded on the wireless auxiliary stream device. Specifically, the to-be-projected data can be encoded through the second encoding and decoding module of the wireless auxiliary stream device. As shown in FIG. 19, a specific process is as follows:

The first transmission module 301 is further configured to recognize whether the transmission port of the terminal device 20 connected to the wireless auxiliary stream device 10 supports the preset communication protocol.

The second encoding and decoding module 1901 is configured to: when it is recognized that the transmission port of the terminal device 20 supports the preset communication protocol, perform the second encoding on the to-be-projected audio data after receiving the to-be-projected audio data sent by the terminal device 20.

The second transmission module 302 is further configured to transmit secondly encoded to-be-projected audio data to the extended display device 30, whereby the extended display device 30 decodes and plays the secondly encoded to-be-projected audio data.

Specifically, after the wireless auxiliary stream device 10 is connected to the terminal device 20, the first transmission module 301 recognizes whether the transmission port of the terminal device 20 connected to the wireless auxiliary stream device 10 supports the preset communication protocol. Preferably, the preset communication protocol may be the DP signal transmission protocol.

When it is recognized that the transmission port of the terminal device 20 supports the preset communication protocol, the to-be-projected audio data can be encoded in the second encoding and decoding module 1901 of the wireless auxiliary stream device 10. Specifically, when it is recognized that the transmission port of the terminal device 20 supports the preset communication protocol, the to-be-projected audio data sent by the terminal device 20 is received through the first transmission module 301, and the second encoding is performed on the to-be-projected audio data through the second encoding and decoding module 1901. The wireless auxiliary stream device 10 transmits secondly encoded to-be-projected audio data to the extended display device 30 through the second transmission module 302, whereby the extended display device 30 decodes and plays the secondly encoded to-be-projected audio data.

Preferably, when the to-be-projected data includes audio and video data, the second encoding and decoding module 1901 may include a first encoding and decoding submodule and a second encoding and decoding submodule. The first encoding and decoding submodule is configured to encode the to-be-projected audio data, and the second encoding and decoding submodule is configured to encode the to-be-projected video data.

Figure 7:
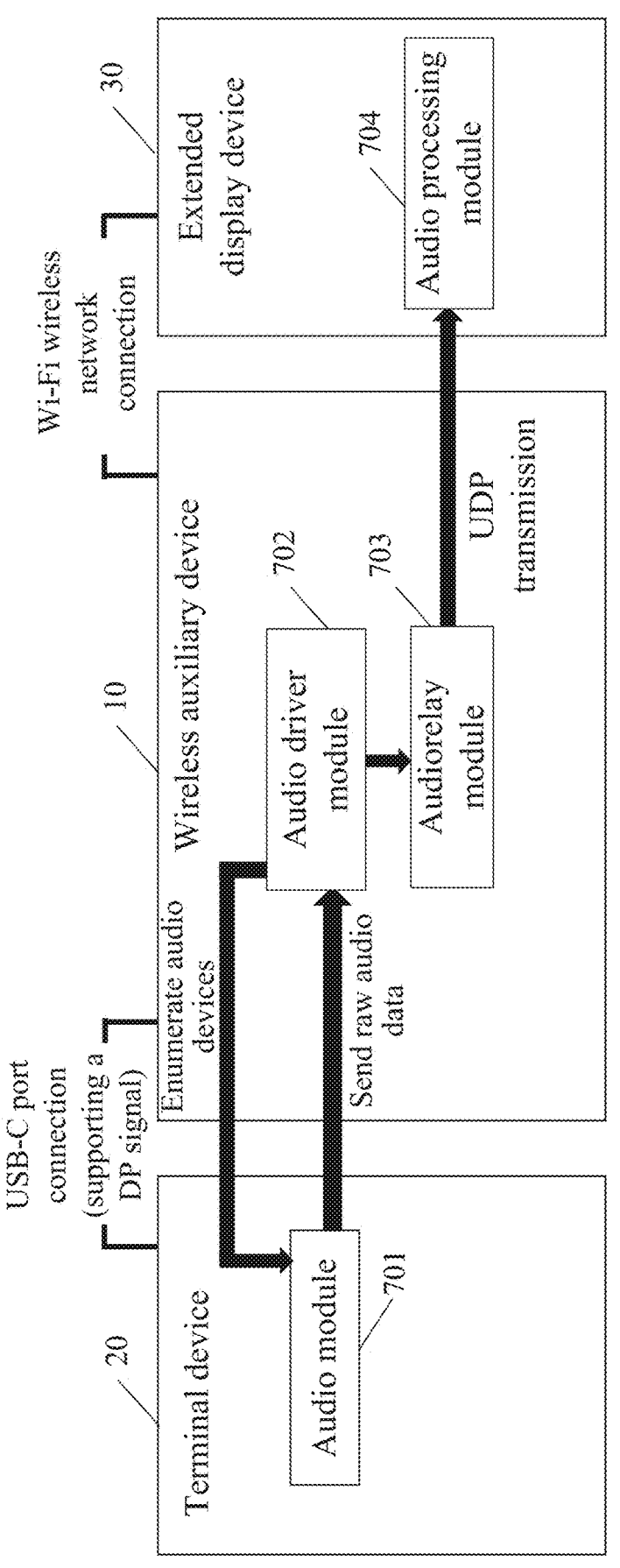
FIG. 7 is a schematic flowchart of encoding to-be-projected audio data according to an embodiment of the present disclosure.

In an implementation solution of this implementation example, FIG. 7 is a schematic diagram of an encoding process of to-be-projected audio data according to an example embodiment of the present disclosure. When the to-be-projected data is the audio data, and it is recognized that the transmission port of the terminal device 20 supports the preset communication protocol, the to-be-projected data can be encoded in the second encoding and decoding module 1901 of the wireless auxiliary stream device 10. The second encoding and decoding module 1901 is a module with a hardware structure in the wireless auxiliary stream device, including an audiorelay module 703. The wireless auxiliary stream device 10 includes an audio driver module 702 for enumerating a sound card and controlling an audio switch of the terminal device 20 and the transmission of the to-be-projected audio data. The audiorelay module 703 is configured to collect and encode the to-be-projected audio data.

Further, the wireless auxiliary stream device 10 further includes a service management module (not shown in the figure), which is configured to obtain signaling based on information sent by the terminal device 20 and received by the first transmission module 301, and send corresponding device information of the wireless auxiliary stream device 10 to the terminal device 20. The business management module is connected to the audiorelay module 703 and is further configured to control time and a method of transmitting the encoded audio data by the audiorelay module 703.

Specifically, the business management module manages the device information, a lighting effect, a key, and the like of the wireless auxiliary stream device 10, and receives control signaling transmitted by the terminal device 20. For example, when the terminal device 20 needs to query and obtain the device information of the wireless auxiliary stream device 10, the terminal device 20 transmits the control signaling to the business management module of the wireless auxiliary stream device 10 through the USB interface to obtain the information. For another example, the business management module is connected to the audiorelay module 703, and the business management module controls time and a condition of sending the to-be-projected data of the terminal device 20 by the audiorelay module 703.

Further, the business management module may be disposed on the extended display device 30 instead of the wireless auxiliary stream device 10 to control the screen projection on the extended display device 30.

Referring to FIG. 7, when the first transmission module 301 is the USB port, the transmission port of the terminal device 20 connected to the first transmission module 301 is also the USB port, such as the USB-C port shown in FIG. 7, the second transmission module 302 is the Wi-Fi module, and the preset communication protocol is the DP signal transmission protocol, if the to-be-projected data is the audio data, a specific process of completing the second encoding for the to-be-projected audio data on the wireless auxiliary stream device 10 is as follows:

When the transmission port of the terminal device 20 supports the DP signal, the wireless auxiliary stream device 10 is enumerated as a standard HDMI SPK device through gadget.ko of the USB driver module (not shown in the figure) in the core of the audio driver module 702 of the wireless auxiliary stream device 10 to connect to the terminal device 20, thereby achieving the data transmission. When the user triggers the screen projection operation and the wireless auxiliary stream device 10 starts the screen projection, an audio module 701 of the terminal device 20 selects an enumerated "Yealink Audio" as an audio output device. The audio module 701 of the terminal device 20 outputs raw data (audio data that has not been encoded or processed) of the to-be-projected audio data to the audio driver module 702 of the wireless auxiliary stream device 10.

The audio driver module 702 transmits the to-be-projected audio data of the terminal device 10 to the audiorelay module 703 for the second encoding, and transmits, through the Wi-Fi module of the wireless auxiliary stream device, secondly encoded to-be-projected audio data of the terminal device 20 to an audio processing module 704 for processing audio data on the extended display device 30 to play the audio data on the extended display device 30. Preferably, when the wireless auxiliary stream device 10 performs wireless communication with the extended display device 30 through the Wi-Fi module, the wireless communication may adopt the UDP as the transport layer protocol.

Figure 8:
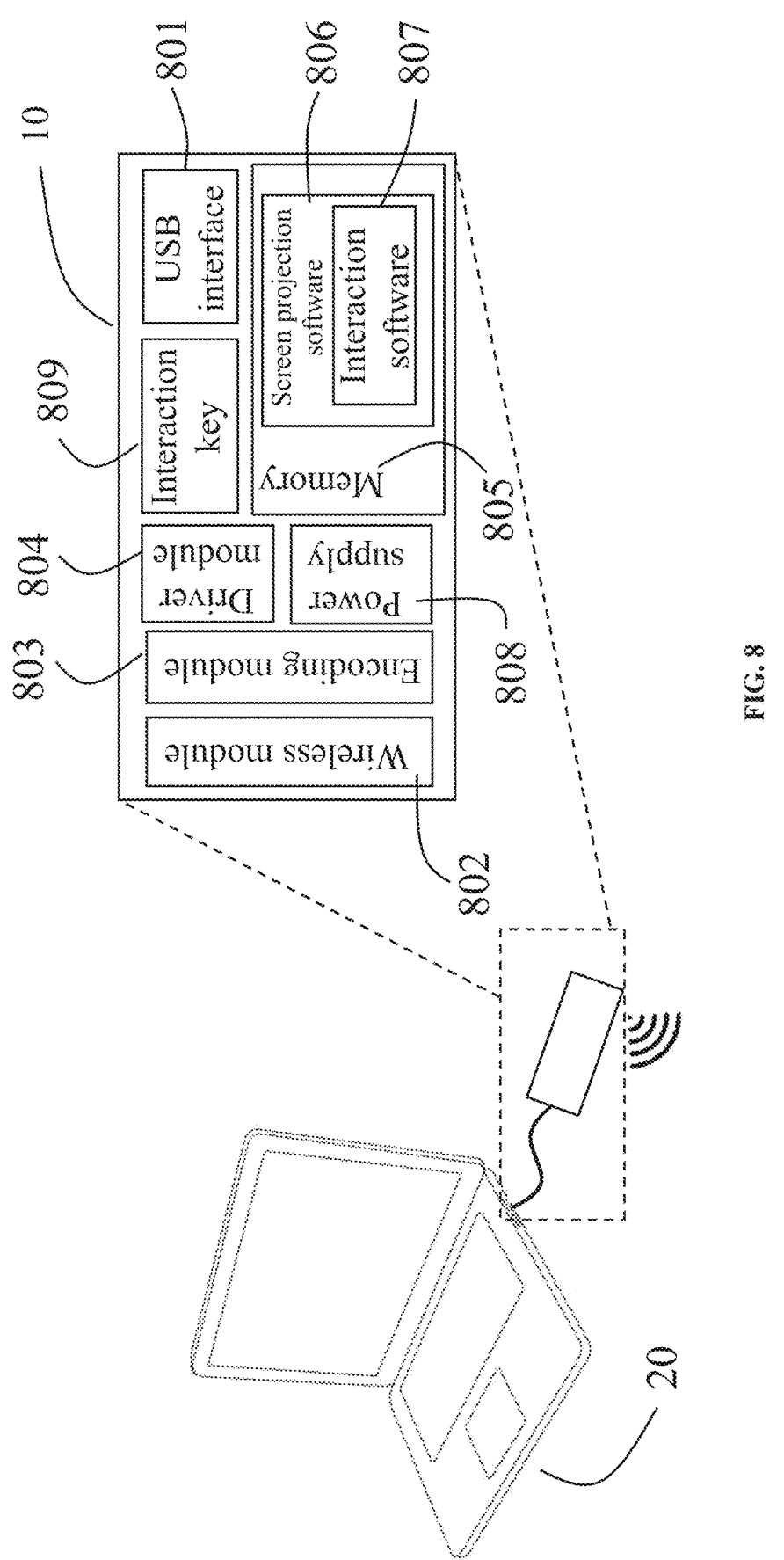
FIG. 8 is a schematic diagram of an internal structure of a wireless auxiliary stream device according to an example embodiment of the present disclosure.

In an implementation example, FIG. 8 is a schematic diagram of an internal structure of a wireless auxiliary stream device according to an example embodiment of the present disclosure. The wireless auxiliary stream device 10 includes the first transmission module 301 (namely, a USB interface 801 in FIG. 8) for establishing the first connection to the terminal device 20, the second transmission module 302 (namely, a wireless module 802 in FIG. 8) for establishing the second connection to the extended display device 30, the second encoding and decoding module (namely, an encoding module 803 in FIG. 8) for encoding the to-be-projected data generated by the terminal device 20 when the first transmission module 301 recognizes that the transmission port of the terminal device 20 connected to the wireless auxiliary stream device 10 supports the preset communication protocol, the to-be-projected data obtaining module (namely, a driver module 804 in FIG. 8) for collecting the to-be-projected data from the terminal device 20, and the storage module (namely, a memory 805 in FIG. 8) for storing the screen projection program file. The storage module includes the screen projection program file (namely, screen projection software 806 in FIG. 8) for displaying the interaction interface on the terminal device 20 and obtaining the to-be-projected data generated based on a user operation on the interaction interface of the terminal device 20. The screen projection program file includes the first encoding and decoding module (namely, interaction software 807 in FIG. 8) for encoding the to-be-projected data generated by the terminal device 20 when the first transmission module 301 recognizes that the transmission port of the terminal device 20 connected to the wireless auxiliary stream device 10 does not support the preset communication protocol.

Preferably, the wireless auxiliary stream device 10 further includes a power supply 808, configured to power the wireless auxiliary stream device 10. In a power supply method, the power supply 808 is connected to the first transmission module 301. When the wireless auxiliary stream device 10 is connected to the terminal device 20 through the first transmission module 301, the terminal device 20 charges the power supply 808. In another power supply method, the power supply 808 includes a rechargeable battery. The wireless auxiliary stream device 10 also includes a charging interface configured to connect an external power supply or an external charger. The wireless auxiliary stream device 10 is powered by the external power supply or the external charger. When the wireless auxiliary stream device 10 is connected to the terminal device 20, the terminal device 20 does not power the wireless auxiliary stream device 10. In still another power supply method, the power supply 808 includes a replaceable disposable battery. The wireless auxiliary stream device 10 is powered the disposable battery. When the wireless auxiliary stream device 10 is connected to the terminal device 20, the terminal device 20 does not power the wireless auxiliary stream device 10.

Further, the wireless auxiliary stream device is equipped with an interaction key 809, and the user can activate the screen projection function by triggering the interaction key 809 on the wireless auxiliary stream device 10. The interaction key 809 may be a physical key, an electronic touch key, or a gesture recognition control. When receiving a triggering instruction of the interaction key 809, the wireless auxiliary stream device 10 activates the first transmission module 301, the interaction interface generation module 303, the to-be-projected data obtaining module 304, and the second transmission module 302 to enable the screen projection function.

Optionally, the wireless auxiliary stream device 10 may not be equipped with any interaction key. When the terminal device 20 is connected to the wireless auxiliary stream device 10 through the first transmission module 301, the screen projection function is enabled directly.

In another implementation example, the wireless auxiliary stream device includes a processor. The processor is further configured to execute the program modules stored in storage devices (such as a ROM, a RAM, a hard disk, an optical disk, and an accompanying drive) on the wireless auxiliary stream device, including the first transmission module, the interaction interface generation module, the to-be-projected data obtaining module, the second transmission module, the second encoding and decoding module, the storage module, the pairing module, and the configuration file updating module.

A wireless auxiliary stream device provided in the embodiments of the present disclosure is connected to both a terminal device and an extended display device. Screen projection data is transmitted between the terminal device and the extended display device through the wireless auxiliary stream device, and the terminal device does not need to be directly connected to the extended display device. In addition, the wireless auxiliary stream device can be connected to the terminal device through a standard unified interface. Therefore, the wireless auxiliary stream device does not need to be equipped with a plurality of interfaces of different standards to be compatible with a display output interface of the terminal device. When the wireless auxiliary stream device is connected to the terminal device, an interaction interface generation module displays an interaction interface on a local display device of the terminal device. A plurality of triggerable function keys are provided on the interaction interface, including program display keys corresponding to a plurality of programs and a screen display key, and the programs are programs currently running on the terminal device. The screen display key corresponds to full-screen data of a desktop of the terminal device. When a command of a display key of a target program triggered by a user is received, to-be-projected data generated by the target program on the terminal device is obtained through a to-be-projected data obtaining module, and the to-be-projected data sent by the terminal device is received through a first transmission module. The to-be-projected data is transmitted to the extended display device through a second transmission module, whereby the extended display device performs screen projection on the to-be-projected data. Based on a selection of the user, only the to-be-projected data generated based on the target program selected by the user is obtained and transmitted, achieving selection of projected content. The to-be-projected data is generated only based on the content of the target program selected by the user and transmitted to the extended display device for the screen projection, without a need to perform the screen projection on an entire screen and all programs of the local display device, thereby protecting user privacy. In addition, the screen projection data is transmitted between the terminal device and the extended display device through the independent wireless auxiliary stream device, and there is no need to establish a direct connection between the terminal device and the extended display device, making it simple to deploy the solution. In addition, the screen projection data is transmitted between the wireless auxiliary stream device and the extended display device through a wireless connection. The screen projection data is transmitted through a wireless network of the wireless auxiliary stream device, and the transmission process does not need to rely entirely on a network resource of the terminal device or the extended display device, thereby optimizing deployment of network resources and improving convenience of the screen projection solution.

Embodiment 2

FIG. 9 is a step flowchart of a screen projection method based on a wireless auxiliary stream device according to an embodiment of the present disclosure. This embodiment of the present disclosure provides a screen projection method based on a wireless auxiliary stream device, applied to the wireless auxiliary stream device in Embodiment 1. The wireless auxiliary stream device establishes a first connection to a terminal device and a second connection to an extended display device. The screen projection method based on a wireless auxiliary stream device may specifically include following steps.

S901: Display an interaction interface on a local display device of the terminal device, where a plurality of triggerable function keys are provided on the interaction interface, the function keys include program display keys corresponding to a plurality of programs and a screen display key, and the programs are programs currently running on the terminal device; and the interaction interface is displayed only on the local display device and can also be captured for screen projection.

In an implementation example, before the displaying an interaction interface on a local display device of the terminal device, the screen projection method further includes:

transmitting a screen projection program file to the terminal device 20 when the terminal device 20 is connected, whereby the terminal device 20 installs the screen projection program file, wherein the screen projection program file is used to display the interaction interface on the local display device 201 of the terminal device 20, and when a command of a display key of a target program triggered by a user is received, to-be-projected data of the target program generated on the terminal device 20 is obtained from the terminal device 20.

Specifically, when the wireless auxiliary stream device 10 is used on the terminal device 20 for the first time, the wireless auxiliary stream device 10 transmits the screen projection program file stored in a storage module to the terminal device 20, whereby the terminal device 20 downloads and installs the screen projection program file, in other words, screen projection software. The screen projection software is used to generate the interaction interface on the terminal device 20 and obtain the to-be-projected data from the terminal device 20. Afterwards, the terminal device 20 correspondingly starts a background program of the screen projection software to detect the wireless auxiliary stream device 10, and automatically starts the screen projection software to generate the interaction interface after discovering that the wireless auxiliary stream device 10 is connected.

Specifically, when the wireless auxiliary stream device 10 is connected to the terminal device 20, the terminal device 20 recognizes that the wireless auxiliary stream device 10 is connected, and the local display device 201 of the terminal device 20 automatically pops up the interaction interface generated by the screen projection software installed on the terminal device 20.

The function keys are provided on the interaction interface, and include the program display keys corresponding to the programs and the screen display key. The function keys further include a selection key for screen projection quality and a function selection key for whether the screen projection is automatically performed when the wireless auxiliary stream device 10 is inserted next time. The user can adjust display quality of a picture on the extended display device through the selection key for screen projection quality. The adjustment of the display quality may be adjustment of resolution of the displayed picture. If a physical key, a touch key, or a gesture recognition control is disposed on the wireless auxiliary stream device 10, pop-up of the interaction interface may be controlled by the physical key, the touch key, or the gesture recognition control.

In the prior art, there is only one physical key on the wireless auxiliary stream device 10, which is not conducive to function expansion of the screen projection. For example, in the case of a good network condition, the user may choose higher screen projection quality. In the case of a poor network condition, the user may perform the screen projection by giving a priority to fluency. However, the one physical key cannot complete these expanded functions. However, in the present disclosure, the function keys can be provided on the interaction interface to ensure the function expansion of the screen projection.

S902: When receiving the command of the display key of the target program triggered by the user, obtain the to-be-projected data of the target program generated on the terminal device.

When the command of the display key of the target program triggered by the user is received, the screen projection software installed on the terminal device 20 collects program data of the target program (such as window image and/or audio data of the target program) in the terminal device 20 to obtain the to-be-projected data. Specifically, the to-be-projected data is corresponding program data obtained from the terminal device 20 based on the target program selected by the user, and is displayed on the extended display device 30.

In an implementation example, the to-be-projected data includes image data and audio data. When the to-be-projected data is the image data, the to-be-projected data undergoes first encoding performed by the terminal device 20 or second encoding performed by the wireless auxiliary stream device 10. A process of performing the first encoding on the to-be-projected image data by the terminal device 20 or performing the second encoding on the to-be-projected image data by the wireless auxiliary stream device 10 is the same as that in the solution recorded in Embodiment 1, and details are not described herein again.

In an implementation example, a complete screen projection method for obtaining an image of the target program is provided. There are N target programs, where N≥1. FIG. 10 is a step flowchart of a first method of generating the to-be-projected image data according to an example embodiment of the present disclosure. A specific process of executing the step S902 includes following substeps:

Substep S1001: Obtain an identifier corresponding to the target program.

Specifically, the obtaining an identifier corresponding to the target program is to obtain a handle value corresponding to the target program. When the terminal device 20 is a device using a Windows system, the terminal device has handle values to identify different instances in different objects and classes in an application, such as a window, a button, an icon, a scrollbar, a control, or a file. One handle value can be used to specify a specific application window. Therefore, a handle value corresponding to each program in the terminal device 20 can be used as an identifier.

Substep S1002: Search for window image information of the target program from the terminal device based on the identifier, where the window image information includes position information and pixel value information of each pixel in the image of the target program.

Specifically, after obtaining the handle value corresponding to the target program, the terminal device 20 calls an application programming interface (API) of a system of the terminal device 20 to obtain numerical value information of a pixel position of a window image of the to-be-projected target program based on the handle value corresponding to the target program. Based on the numerical value information, the window image information of the to-be-projected target program is obtained from a memory of the terminal device.

Substep S1003: Generate, on the terminal device, a black area with a same size as a desktop displayed on the local display device.

Specifically, a memory area is requested in the screen projection software of the terminal device 20 to draw a black canvas, and the black area with the same size as the desktop displayed on the local display device 201 is generated. Preferably, resolution of the black area is set to 1080p, and all pixels in the area are set to black to generate the black area.

Substep S1004: Copy the image of the target program to the black area based on the window image information, to generate the to-be-projected image data.

Specifically, since the window image information includes the position information and the pixel value information of each pixel in the image of the target program, the numerical value information of the pixel position of the window image of the to-be-projected target program is copied to the black area based on the window image information, thereby copying the image of the to-be-projected target program to the black area and generating the to-be-projected image data. Preferably, there may be one or more to-be-projected target program windows, depending on a quantity of target program windows selected by the user on the interaction interface.

Figure 11:
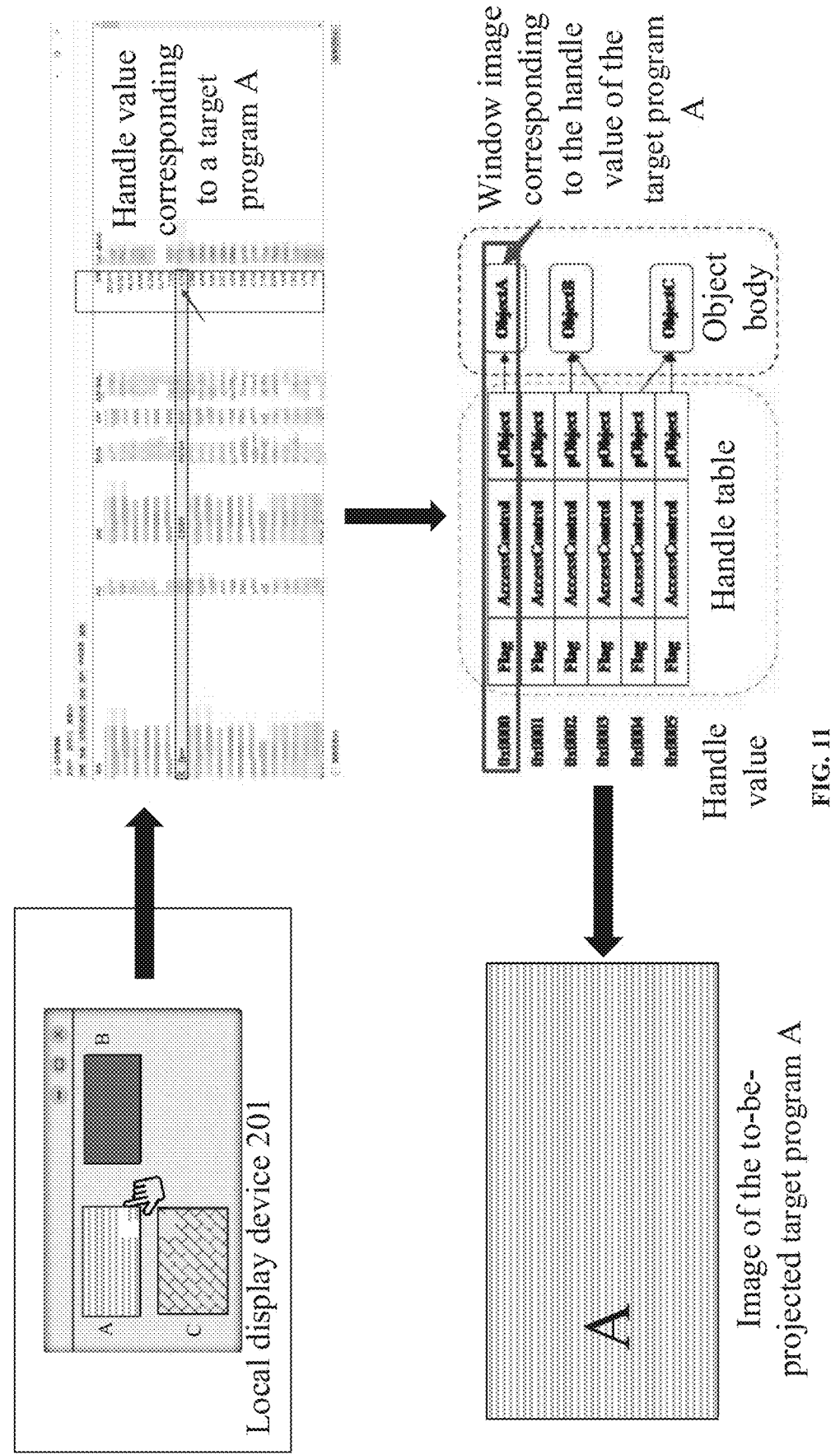
FIG. 11 is a sample graph of an interface for generating to-be-projected image data according to an example embodiment of the present disclosure.

FIG. 11 is a sample graph of an interface for generating the to-be-projected image data according to an implementation example of the present disclosure. As shown in FIG. 11, a plurality of programs A, B, C, and the like are displayed on the local display device 201 of the terminal device 20. After choosing to perform the screen projection on an image of the target program A on the terminal device 20, the user obtains a handle value of the target program A and searches for window image information of the target program A from the terminal device 20 based on the handle value. The black area with the same size as the desktop displayed on the local display device 201 is generated on the terminal device 20, and a window image of the target program A is copied to the black area based on the window image information of the target program A to generate to-be-projected image data. The to-be-projected data is transmitted to the extended display device 30 through the wireless auxiliary stream device 10 for the screen projection.

Figure 12:
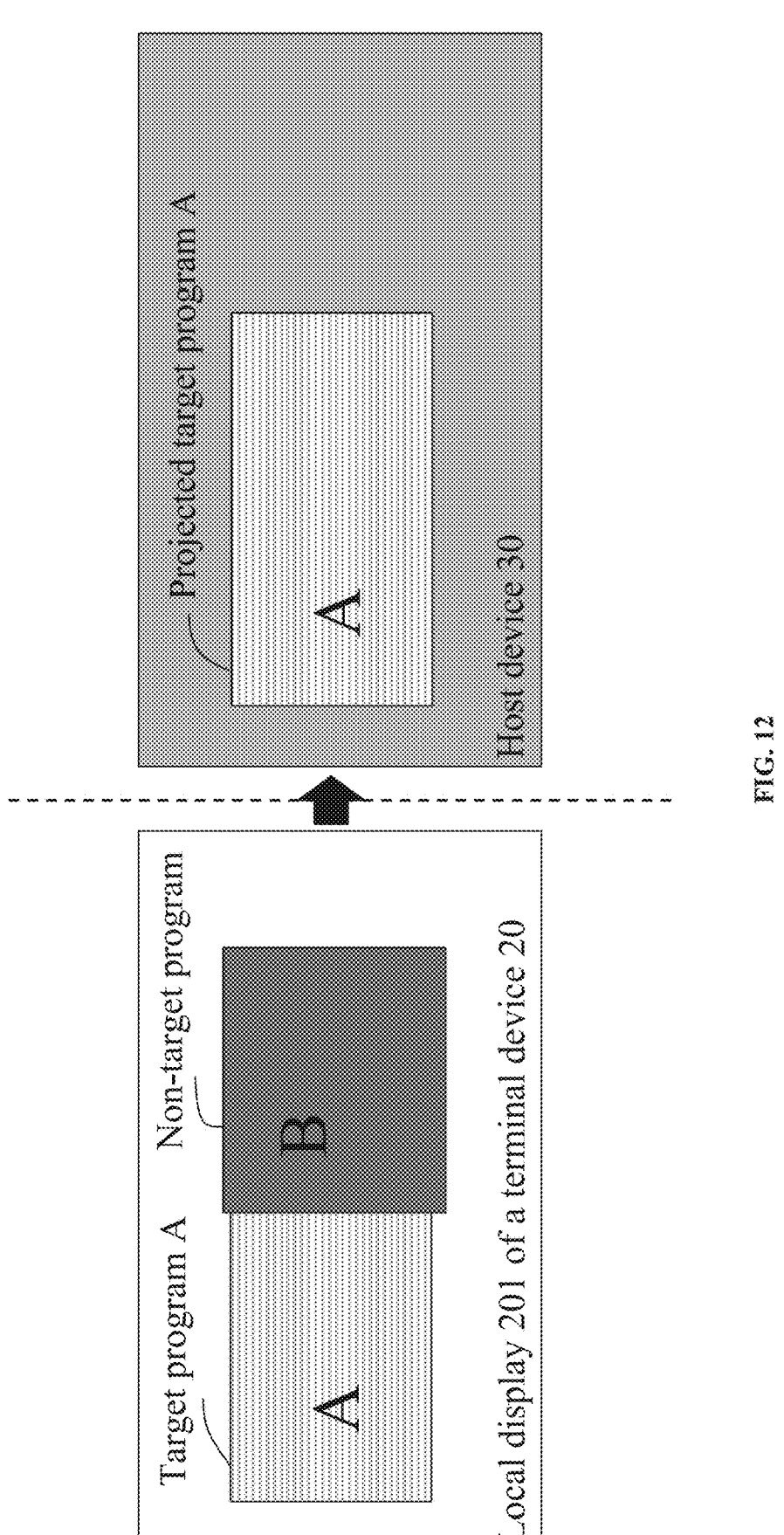
FIG. 12 is a schematic diagram of an interface of a first screen projection method based on a wireless auxiliary stream device according to an implementation example of the present disclosure.

Specifically, FIG. 12 is a schematic diagram of an interface of a first screen projection method based on a wireless auxiliary stream device according to an implementation example of the present disclosure. The figure shows that the image of the target program A is obscured by a non-target program on the local display device 201 of the terminal device 20. The handle value of the target program A is obtained, and the window image information of the target program A is obtained from the terminal device 20 based on the handle value of the target program A. The image of the target program A is copied to the black area based on the window image information to generate the to-be-projected image data. The to-be-projected image data is transmitted to the extended display device 30 through the wireless auxiliary stream device 10 for the screen projection. In this way, a complete image of the to-be-projected target program A is displayed on the extended display device. The handle value can be directly located to a specific application window, and is not affected by a window position of another non-target program or a coverage relationship between a window of the another non-target program and a window of the target program A. Moreover, after the window of the target program A is moved on the terminal device 20, the handle value of the window of the originally selected to-be-projected target program does not change. There is no need to obtain identifier information corresponding to the moved target program again after moving the target program. This solution is easy to operate, and the complete window image information of the target program A can be found from the terminal device based on the handle value of the target program.

Preferably, after generating the to-be-projected image data, the terminal device 20 can also adjust the to-be-projected image data based on image size and resolution parameters displayed by the extended display device to obtain updated to-be-projected image data. The image size and resolution parameters displayed by the extended display device 30 can be transmitted to the wireless auxiliary stream device 10 by the extended displayed device 30, and then transmitted to the terminal device 20 by the wireless auxiliary stream device 10.

The to-be-projected image data is adjusted based on the image size and resolution parameters of the extended display device 30. In this way, when the updated to-be-projected image data is displayed on the extended display device 30, the image of the target program can match image size and resolution requirements of the extended display device 30 and can be completely projected onto the extended display device 30.

Preferably, after the to-be-projected image data is generated, the wireless auxiliary stream device 10 can also send the screen resolution parameter of the extended display device 30 to the terminal device 20. The terminal device 20 adjusts the to-be-projected image data based on the resolution parameter of the extended display device 30 to obtain the updated to-be-projected image data, and transmits the updated to-be-projected image data to the wireless auxiliary stream device 10, whereby the wireless auxiliary stream device 10 transmits the updated to-be-projected image data to the extended display device 30. The extended display device 30 proportionally scales the updated to-be-projected image data based on its own display screen size or a display size of the connected local display device 201.

Figure 13:
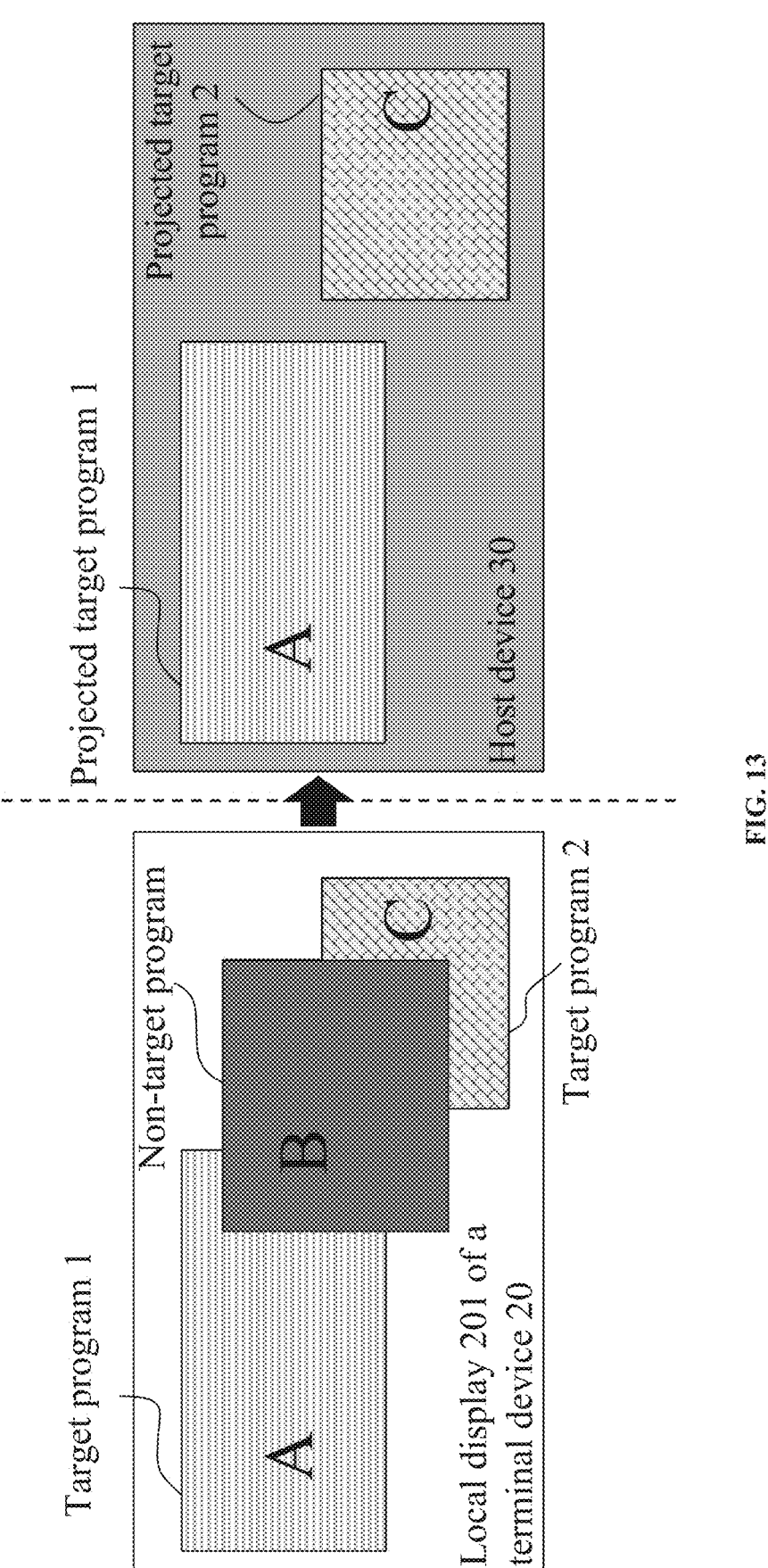
FIG. 13 is a schematic diagram of an interface of a second screen projection method based on a wireless auxiliary stream device according to an implementation example of the present disclosure.

Further, FIG. 13 is a schematic diagram of an interface of a second screen projection method based on a wireless auxiliary stream device according to an implementation example of the present disclosure. There are one or more to-be-projected target programs. For example, as shown in FIG. 13, there are three programs on the local display device 201 of the terminal device 20. When the user chooses to perform the screen projection on image data of two target programs (a target program 1 and a target program 2), the image data of the target program 1 and the target program 2 is obtained based on handle values of the selected target program 1 and target program 2, and to-be-projected image data is generated based on the image data of the target programs and transmitted to a host device 30 (namely, the extended display device) through the wireless auxiliary stream device 10 for the screen projection and display.

Figure 14:
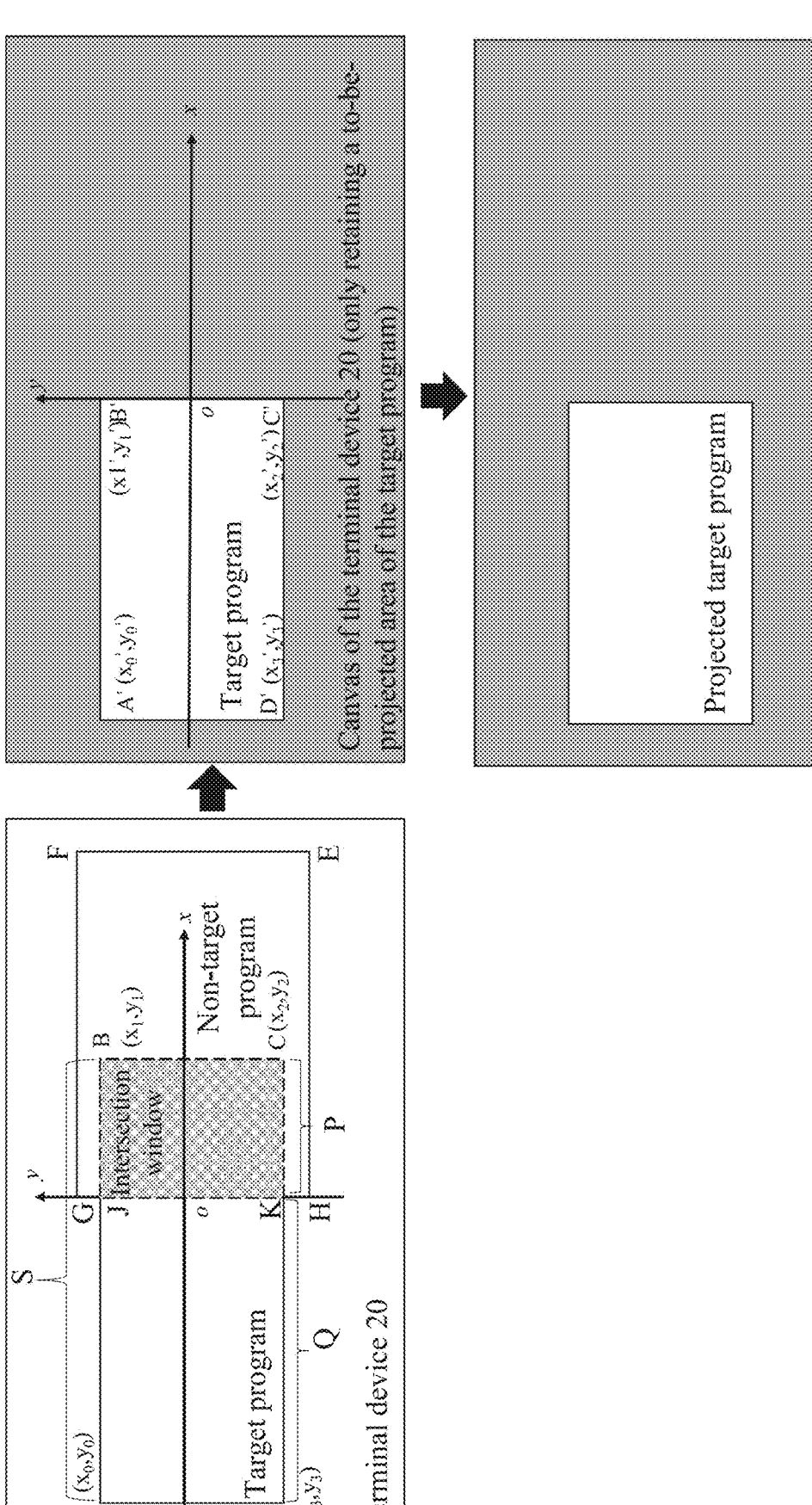
FIG. 14 is a schematic diagram of an interface of a third screen projection method based on a wireless auxiliary stream device according to an implementation example of the present disclosure.
Figure 15:
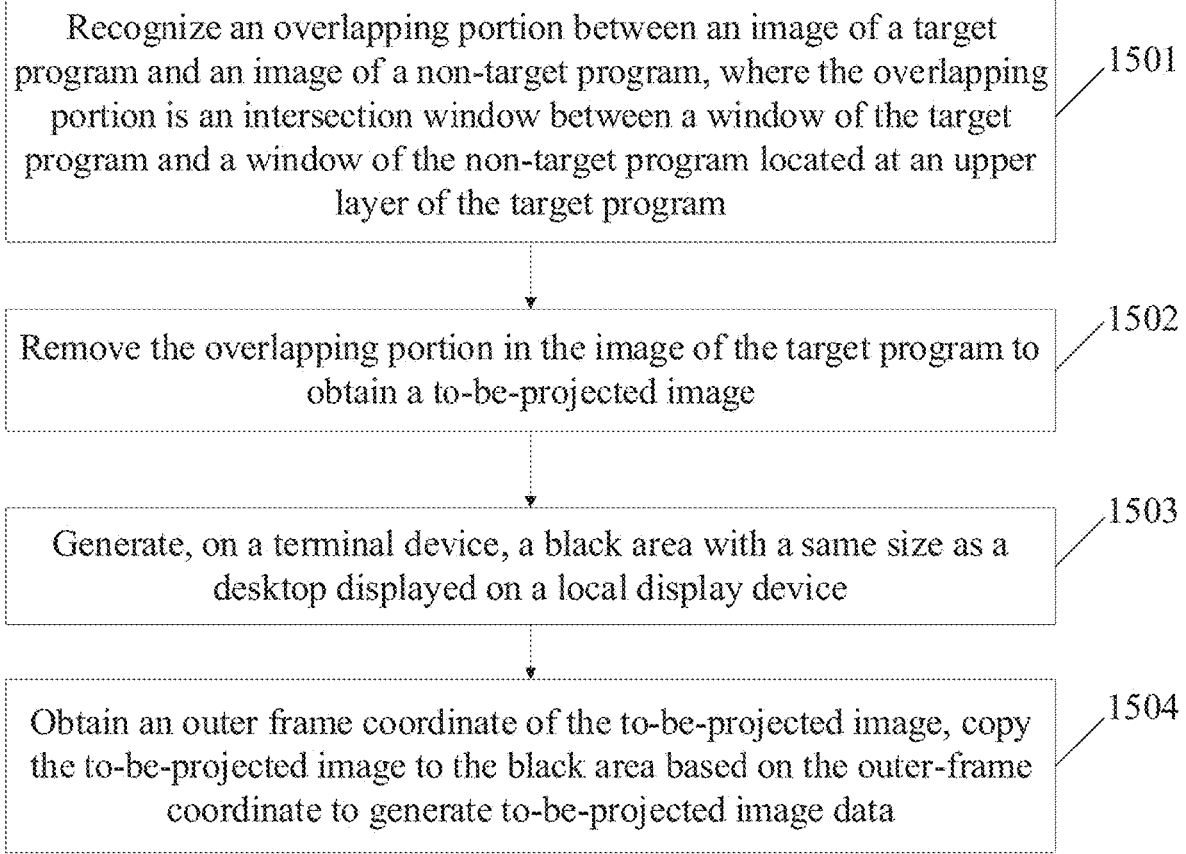
FIG. 15 is a step flowchart of a second method of generating to-be-projected image data according to an example embodiment of the present disclosure.

In another implementation example, a screen projection method is provided to prevent leakage of information in an obscured area of the image of the target program. FIG. 14 is a schematic diagram of an interface of a third screen projection method based on a wireless auxiliary stream device according to an implementation example of the present disclosure. There are N target programs, where N≥1. The programs include the target program and a non-target program located at an upper layer of the target program. A size of an image that can be displayed by the extended display device 30 is consistent with a size of an image that can be displayed by the local display device 201, and coordinate axes established by the extended display device 30 and the local display device 201 are consistent. FIG. 15 is a step flowchart of a second method of generating the to-be-projected image data according to an example embodiment of the present disclosure. A specific process of performing the step S902 includes following substeps:

Substep S1501: Recognize an overlapping portion between the image of the target program and an image of the non-target program, where the overlapping portion is an intersection window between a window of the target program and a window of the non-target program located at the upper layer of the target program.

In specific implementation, as shown in FIG. 14, a stacking order of the window of the target program and a window of another non-target program is obtained through a system interface of the terminal device 20. A window (an area EFGH in FIG. 14) that is of the another non-target program and located at an upper layer of the window (an area ABCD in FIG. 14) of the target program is selected, and an intersection window (an area BCKJ in FIG. 14) between the window of the target program and the window of the another non-target program is calculated to obtain an overlapping portion, namely an intersection window P in FIG. 14.

Substep S1502: Remove the overlapping portion in the image of the target program to obtain a to-be-projected image.

In specific implementation, the window of the target program is set as S, and a to-be-projected area in the window of the target program is set as Q. The overlapping portion is removed from the image of the target program to obtain the to-be-projected image Q, where Q=S−P.

Substep S1503: Generate, on the terminal device, the black area with the same size as the desktop displayed on the local display device.

In specific implementation, a canvas whose bottom color is black and has a same size as the desktop displayed on the local display device 201 of the terminal device 20 is disposed in the memory of the terminal device 20 to obtain the black area.

Substep S1504: Obtain an outer frame coordinate of the to-be-projected image, copy the to-be-projected image to the black area based on the outer-frame coordinate to generate the to-be-projected image data.

In specific implementation, as shown in FIG. 14, a coordinate system is established with an origin of a screen of the local display device 201 as a center point O of the screen, and outer frame coordinates of the to-be-projected image Q (namely, coordinates of four vertices A, J, K, and D in an area AJKD in FIG. 14) are obtained. Based on the outer frame coordinates, a to-be-projected image in a to-be-projected area (the area AJKD in FIG. 14) that only retains the window of the target program is copied to the black area (namely, the canvas of the terminal device 20), and to-be-projected image data (image data of the canvas including a to-be-displayed area A'B'C'D' in FIG. 14). The to-be-projected image data can be encoded into an H.264 stream on the terminal device 20 and transmitted to the wireless auxiliary stream device 10, whereby the to-be-projected image data is transmitted to the extended display device 30 through the wireless auxiliary stream device 10. In this way, the screen projection can be performed on only a portion that is of the window of the target program and does not overlap with the window of the another non-target program on the host device 30, instead of the window of the another non-target program.

In an implementation example, the obtaining an outer frame coordinate of the to-be-projected image in the substep 1504 specifically includes: obtaining all images displayed on the local display device; recognizing a plurality of outer frame coordinates of the target program on all the images; obtaining the outer frame coordinate of the to-be-projected image based on the outer frame coordinates of the target program and the overlapping portion between the target program and the another non-target program.

In specific implementation, as shown in FIG. 14, an entire desktop image of the terminal device is obtained through the system interface of the terminal device 20. The coordinate system is established with the origin of the screen of the local display device as the center point O of the screen, and outer frame coordinates of the window of the non-target program (the area EFGH in FIG. 14) on the desktop image (namely, coordinates of vertices E, F, G, and H in FIG. 14) and positions of outer frame coordinates of the window of the target program (the area ABCD in FIG. 14) (namely, distances of upper, lower, left, and right sides of an outer frame relative to the origin of the screen of the local display device, such as coordinates of vertices A, B, C, and D in FIG. 14) are obtained. Based on the outer frame coordinates of the window of the non-target program, the outer frame coordinates of the window of the target program, and the intersection window P, the outer frame coordinates of the to-be-projected image Q, namely the coordinates of the points A, J, K, and D, are obtained. Based on the outer frame coordinates of the to-be-projected image Q, the to-be-projected image Q is copied to the canvas of the terminal device 20, and canvas data containing the to-be-projected image Q (the area A'B'C'D' on the canvas of the terminal device 20 in FIG. 14) is obtained as the to-be-projected image data.

S903: Receive the to-be-projected data sent by the terminal device.

The wireless auxiliary stream device 10 receives the to-be-projected data sent by the terminal device 20. Specifically, when the to-be-projected data is the image data, the to-be-projected data undergoes the first encoding performed by the terminal device 20 and then sent to the wireless auxiliary stream device 10, or the-to-be-projected is sent by the terminal device 20 to the wireless auxiliary stream device 10 and then undergoes the second encoding performed by the wireless auxiliary stream device 10. A process of performing the first encoding on the to-be-projected image data by the terminal device 20 or performing the second encoding on the to-be-projected image data by the wireless auxiliary stream device 10 is the same as that in the solution recorded in Embodiment 1, and details are not described herein again.

S904: Send the to-be-projected data to the extended display device, whereby the extended display device receives and displays the to-be-projected data sent by the wireless auxiliary stream device.

After receiving the to-be-projected data sent by the terminal device 20, the wireless auxiliary stream device 10 sends the to-be-projected data to the extended display device 30, whereby the extended display device 30 receives and displays the to-be-projected image data. The overlapping portion between the image of the target program and the image of the non-target program is removed, only a non-overlapping portion of the image of the target program is used as the to-be-projected image data, and a remaining area is displayed as the black area. In this way, only the window image of the to-be-projected target program is projected on the extended display device 30 without displaying the window image of the another non-target program, thereby achieving selection of projection content and protecting user privacy.

Figure 16:
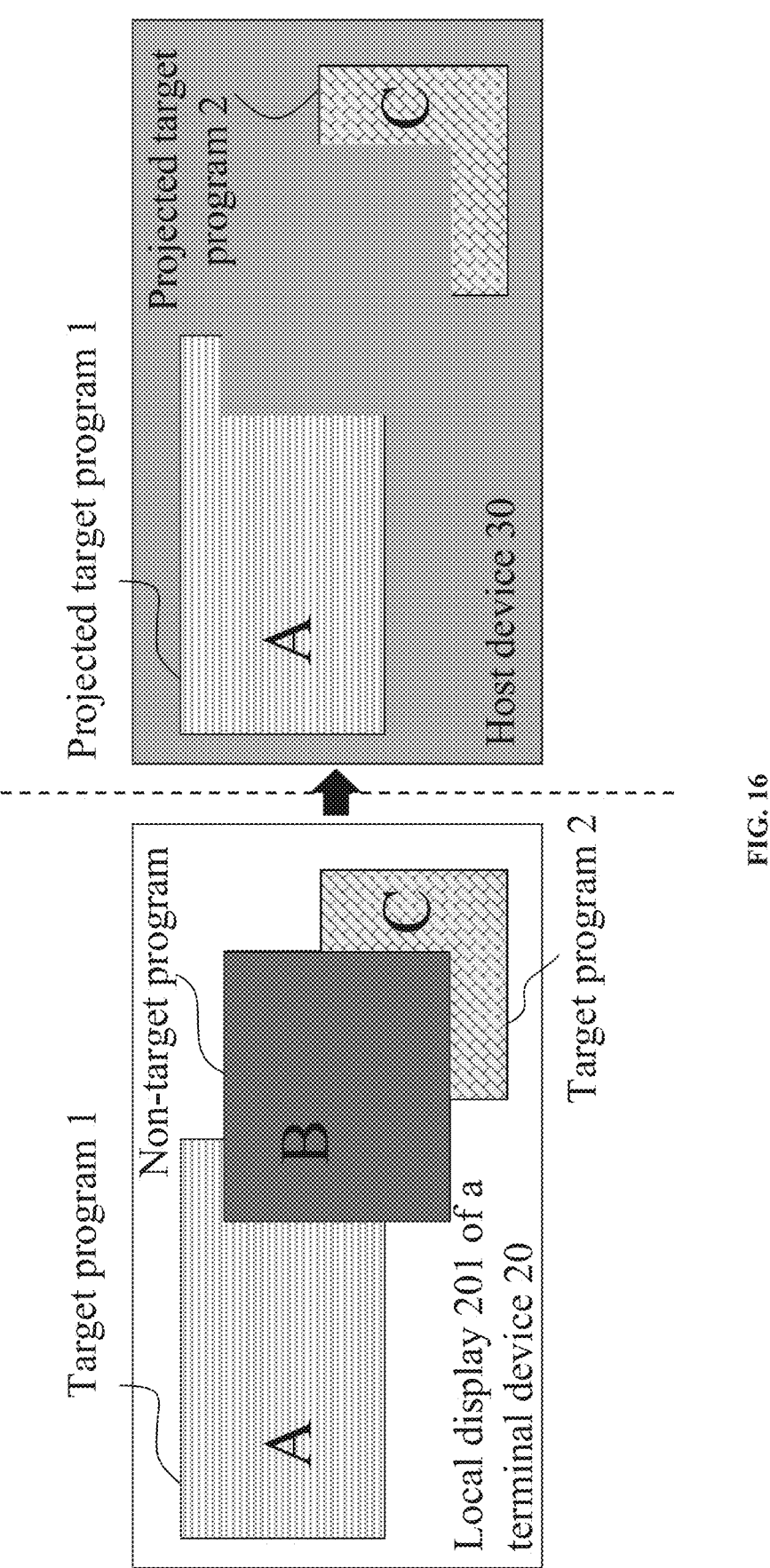
FIG. 16 is a schematic diagram of an interface of a fourth screen projection method based on a wireless auxiliary stream device according to an implementation example of the present disclosure.

Further, there may be one or more to-be-projected target programs. For example, FIG. 16 is a schematic diagram of an interface of a fourth screen projection method based on a wireless auxiliary stream device according to an implementation example of the present disclosure. There are three programs on the local display device 201 of the terminal device 20. When the user chooses to perform the screen projection on image data of two target programs, after removing overlapping portions between the target programs and a non-target program, only non-overlapping portions of images of the target programs are displayed on the extended display device (namely, the host device 30 in FIG. 16).

In an implementation example, there are N target programs, where N≥1. When the to-be-projected data is the audio data, the to-be-projected data generated on the terminal device is source audio data of the target program on the terminal device.

In specific implementation, after the wireless auxiliary stream device 10 is connected to the terminal device 20, the screen projection software installed on the terminal device 20 can collect the source audio data of the target program in a local sound card of the terminal device 20 as the to-be-projected audio data. Specifically, the wireless auxiliary stream device 10 is enumerated as a UAC audio SPK device through its core USB driver module to perform data transmission with the terminal device 20. The terminal device 20 does not encode the source audio data collected from the terminal device 20 and directly sends the source audio data to the wireless auxiliary stream device 10 as the to-be-projected audio data. After receiving the to-be-projected audio data sent by the terminal device 20, the wireless auxiliary stream device 10 does not encode the to-be-projected audio data either, and directly transmits the to-be-projected audio data to the extended display device, whereby the extended display device parses and plays the to-be-projected audio data.

In another implementation example, there are N target programs, where N≥1. When the to-be-projected data is the audio data, the receiving the to-be-projected data sent by the terminal device, and sending the to-be-projected data to the extended display device, whereby the extended display device receives and plays the to-be-projected audio data sent by the wireless auxiliary stream device specifically includes:

receiving the source audio data sent by the terminal device; encoding the source audio data; and sending encoded source audio data to the extended display device as the to-be-projected audio data, whereby the extended display device receives, decodes, and plays-be-projected audio data.

In specific implementation, after the wireless auxiliary stream device 10 is connected to the terminal device 20, a first transmission module 301 of the wireless auxiliary stream device 10 recognizes whether a transmission port of the terminal device 20 connected to the wireless auxiliary stream device 10 supports a preset communication protocol. Preferably, the preset communication protocol may be a DP signal transmission protocol. When it is recognized that the transmission port of the terminal device 20 supports the preset communication protocol, the source audio data can be encoded in a second encoding and decoding module of the wireless auxiliary stream device 10. Specifically, when it is recognized that the transmission port of the terminal device 20 supports the preset communication protocol, the source audio data sent by the terminal device 20 is received through the first transmission module 301, and undergoes the second encoding performed by the second encoding and decoding module. The wireless auxiliary stream device 10 transmits source audio data obtained after the second encoding to the extended display device 30 as the to-be-projected audio data through a second transmission module 302, whereby the extended display device 30 decodes and plays the to-beprojected data. A process of performing the second encoding on the source audio data by the wireless auxiliary stream device is the same as that in the solution recorded in Embodiment 1, and details are not described herein again.

In an implementation example, when the wireless auxiliary stream device is used for the first time, the wireless auxiliary stream device needs to be paired with the extended display device before the terminal device is connected. FIG. 17 is a step flowchart of pairing the wireless auxiliary stream device and the extended display device according to an embodiment of the present disclosure. The pairing method includes following steps:

S1701: Connect the extended display device, establish a third connection and a fourth connection to the extended display device, and enumerate the extended display device as a first device type.

In specific implementation, when the wireless auxiliary stream device 10 is connected to the extended display device 30 for the first time, the wireless auxiliary stream device 10 also needs to perform device pairing with the extended display device 30. When performing the device pairing with the extended display device 30, the wireless auxiliary stream device 10 does not need to connect to the terminal device 20. In a device pairing process, the wireless auxiliary stream device 10 needs to establish a wired connection to the extended display device 30. Therefore, before being connected to the terminal device, the wireless auxiliary stream device 10 is connected to the extended display device 30. In this case, the wireless auxiliary stream device 10 establishes the third connection to the extended display device 30. Specifically, when the first transmission module 301 is a USB port, the third connection established between the wireless auxiliary stream device 10 and the extended display device 30 is a wired connection established through the USB port.

Under a normal condition, in order to speed up the screen projection, after being powered on and started, the wireless auxiliary stream device 10 often sets to first establish a wireless connection to the to-be-paired extended display device 30 automatically through the second transmission module 302, namely the fourth connection established to the extended display device 30. Specifically, the fourth connection is a wireless connection, and is preferably a wireless Wi-FI connection or a Bluetooth wireless connection.

S1702: Recognize a scenario of connecting the extended display device.

S1703: In a scenario of pairing with the extended display device, interrupt the fourth connection to the extended display device.

In specific implementation, when the wireless auxiliary stream device 10 performs the device pairing with the to-be-paired extended display device 30, in order to avoid a pairing failure because the wireless auxiliary stream device 10 and the to-be-paired extended display device 30 cannot normally transmit pairing information or update a pairing file due to the fourth connection (wireless connection) established between the wireless auxiliary stream device 10 and the to-be-paired extended display device 30, the wired connection to the to-be-paired extended display device 30 needs to be established through the first transmission module 301. Therefore, the wireless auxiliary stream device 10 must interrupt the fourth connection (namely, the wireless connection) to the to-be-paired extended display device 30.

S1704: Reset the enumerated first device type to a preset device type, and perform the pairing with the extended display device.

In specific implementation, when the wireless auxiliary stream device 10 is connected to the extended display device 30, a default enumerated device type, namely the first device type, is usually set. In the scenario of pairing with the to-be-paired extended display device 30, the default enumerated device type may not be paired with the to-be-paired extended display device 30, and the enumerated device type of the wireless auxiliary stream device 10 needs to be reset. Before the terminal device 20 is connected, in the scenario of pairing with the extended display device 30, the enumerated first device type is set to the preset device type to perform the pairing with the extended display device 30.

S1705: Update a configuration file based on configuration information that is of the extended display device and obtained in a pairing process to complete the pairing with the extended display device.

In specific implementation, after the to-be-paired extended display device 30 is paired and connected, the configuration information of the to-be-paired extended display device 30 is obtained. The configuration file of the wireless auxiliary stream device 10 is updated based on the obtained configuration information of the extended display device 30 to complete the pairing between the wireless auxiliary stream device 10 and the extended display device 30.

S1706: Interrupt the third connection to the extended display device.

In specific implementation, after the wireless auxiliary stream device 10 completes the pairing with the extended display device 30, the wireless auxiliary stream device 10 automatically interrupts the third connection to the extended display device 30.

After the wireless auxiliary stream device 10 completes the pairing with the extended display device 30, parameters in the configuration file of the wireless auxiliary stream device 10 have been updated correspondingly based on the configuration information of the extended display device 30. When the terminal device 20 is connected, the wireless auxiliary stream device 10 can directly establish the second connection to the extended display device 30 through the second transmission module 302, achieving the data transmission between the wireless auxiliary stream device 10 and the extended display device 30. The solution is easy to operate, and a fast screen projection response is achieved. When the wireless auxiliary stream device 10 is used for the first time, the wireless auxiliary stream device 10 establishes the wired connection to the extended display device 30 to perform the device pairing. The configuration file of the wireless auxiliary stream device 10 is updated correspondingly based on the configuration information of the extended display device 30 to configure the connected extended display device 30. After completing the pairing, when the wireless auxiliary stream device 10 is powered on and ready to perform the screen projection, the wireless auxiliary stream device 10 can be connected to the paired extended display device 30 directly through the second transmission module 302 to achieve fast connection establishment.

In an implementation example, the foregoing first connection and third connection are used for wired transmission through a USB interface, and the foregoing second connection and fourth connection are used for wireless transmission or Wi-Fi transmission.

A screen projection method based on a wireless auxiliary stream device provided in the embodiments of the present disclosure is applied to a wireless auxiliary stream device. When a terminal device is connected, an interaction interface is displayed on a local display device of the terminal device. A plurality of triggerable function keys are provided on the interaction interface, including program display keys corresponding to a plurality of programs and a screen display key, and the programs are programs currently running on the terminal device. The screen display key corresponds to full-screen data of a desktop of the terminal device. When a command of a display key of a target program triggered by a user is received, to-be-projected data generated by the target program on the terminal device is obtained, and the to-be-projected data sent by the terminal device is received. The to-be-projected data is transmitted to an extended display device, whereby the extended display device performs screen projection on the to-be-projected data. The to-be-projected data is generated only based on content of the target program selected by the user and transmitted to the extended display device for display, without a need to perform the screen projection on an entire screen and all programs of the local display device, achieving selection of projected content and protecting user privacy.

Embodiment 3

Referring to FIG. 1, this embodiment of the present disclosure provides a screen projection system, including a terminal device 20, a wireless auxiliary stream device 10 and an extended display device 30.

The terminal device 20 is connected to the wireless auxiliary stream device 10. The extended display device 30 is connected to the wireless auxiliary stream device 10. The wireless auxiliary stream device 10 is the wireless auxiliary stream device in Embodiment 1 mentioned above. The wireless auxiliary stream device 10 in the screen projection system executes the screen projection method in Embodiment 2 described above.

The embodiments of this specification are described in a progressive manner, and each embodiment focuses on differences from other embodiments. The same or similar parts between the embodiments may refer to each other.

Those skilled in the art should understand that the embodiments of the present disclosure may be provided as a method, an apparatus, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a disk memory, a CD-ROM, an optical memory, and the like) that include computer-usable program codes.

The embodiments of the present disclosure are described with reference to the flowcharts and/or block diagrams of the method, the terminal device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing terminal device to generate a machine, so that the instructions executed by a computer or a processor of another programmable data processing terminal device generate an apparatus for implementing a specific function in one or more processes in the flowcharts and/or in one or more blocks in the block diagrams.

These computer program instructions may also be stored in a computer-readable memory that can instruct a computer or another programmable data processing terminal device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing terminal device, so that a series of operations and steps are performed on the computer or the another programmable terminal device, thereby generating computer-implemented processing. Therefore, the instructions executed on the computer or the another programmable terminal device provide steps for implementing a specific function in one or more processes in the flowcharts and/or in one or more blocks in the block diagrams.

Although preferred embodiments of the present application have been described, persons skilled in the art can make changes and modifications to these embodiments once they learn the basic inventive concept. Therefore, the appended claims are intended to be construed as covering the preferred embodiments and all changes and modifications falling within the scope of the embodiments of the present disclosure.

Finally, it should be further noted that, in this specification, relationship terms such as first and second are only used to distinguish an entity or operation from another entity or operation, but do not necessarily require or imply that there is any actual relationship or order between these entities or operations. Moreover, the terms "include", "comprise" or any other variants thereof are intended to cover non-exclusive inclusion, so that a process, a method, an article, or a terminal device that includes a series of elements not only includes those elements, but also includes those elements that are not explicitly listed, or also includes elements inherent to this process, method, article, or terminal device. Without more restrictions, an element defined by a sentence "including/comprising a . . . " does not exclude the presence of additional identical elements in the process, method, article, or terminal device that includes the element.

The screen projection method and apparatus based on a wireless auxiliary stream device provided in the present disclosure are described above in detail. In this specification, several examples are used for illustration of the principles and implementations of the present disclosure. The description of the foregoing embodiments is only used to help illustrate the method of the present disclosure and the core principles thereof. In addition, a person of ordinary skill in the art can make various modifications in terms of specific implementations and a scope of application in accordance with the teachings of the present disclosure. Based on the foregoing, the content in this specification should not be understood as a limitation on the present disclosure.

The invention claimed is:

1. A wireless auxiliary stream device, wherein the wireless auxiliary stream device is connected to both a terminal device and an extended display device; and the wireless auxiliary stream device comprises:

a first transmission module configured to establish a first connection between the wireless auxiliary stream device and the terminal device;

an interaction interface generation module configured to display an interaction interface on a local display device of the terminal device when the terminal device is connected, wherein a plurality of triggerable function keys are provided on the interaction interface, the function keys comprise program display keys corresponding to a plurality of programs and a screen display key, and the programs are programs currently running on the terminal device;

a to-be-projected data obtaining module configured to: when a command of a display key of a target program triggered by a user is received, obtain to-be-projected data of the target program generated on the terminal device, and receive, through the first transmission module, the to-be-projected data sent by the terminal device; wherein the to-be-projected data is obtained by collecting program data of the target program in the terminal device; and the to-be-projected data comprises image data and/or audio data; and a second transmission module configured to establish a second connection between the wireless auxiliary stream device and the extended display device, and transmit the to-be-projected data to the extended display device, whereby the extended display device performs screen projection on the to-be-projected data;

wherein the wireless auxiliary stream device further comprises a storage module; and the storage module is configured to store a screen projection program file, wherein the screen projection program file comprises the interaction interface generation module and the to-be-projected data obtaining module;

wherein the screen projection program file further comprises a first encoding and decoding module;

the first transmission module is further configured to recognize whether a transmission port of the terminal device connected to the wireless auxiliary stream device supports a preset communication protocol;

the first encoding and decoding module is configured to perform first encoding on the to-be-projected data when it is recognized that the transmission port of the terminal device does not support the preset communication protocol;

the first transmission module is further configured to receive firstly encoded to-be-projected data sent by the terminal device; and the second transmission module is further configured to transmit the firstly encoded to-be-projected data to the extended display device, whereby the extended display device performs the screen projection on the firstly encoded to-be-projected data after decoding the firstly encoded to-be-projected data.

2. The wireless auxiliary stream device according to claim 1, wherein the storage module is configured to transmit the screen projection program file to the terminal device through the first transmission module when the terminal device is connected, whereby the terminal device installs the screen projection program file.

3. The wireless auxiliary stream device according to claim 1, further comprising a second encoding and decoding module;

the first transmission module is further configured to recognize whether a transmission port of the terminal device connected to the wireless auxiliary stream device supports a preset communication protocol;

the second encoding and decoding module is configured to: when it is recognized that the transmission port of the terminal device supports the preset communication protocol, perform second encoding on the to-be-projected data after receiving the to-be-projected data sent by the terminal device; and the second transmission module is further configured to transmit secondly encoded to-be-projected data to the extended display device, whereby the extended display device performs the screen projection on the secondly encoded to-be-projected data after decoding the secondly encoded to-be-projected data.

4. The wireless auxiliary stream device according to claim 1, further comprising a pairing module and a configuration file updating module;

the first transmission module is further configured to: before the terminal device is connected, establish a third connection to the extended display device when the extended display device is connected;

the second transmission module is further configured to establish a fourth connection to the extended display device when the third connection to the extended display device is established, recognize a scenario of connecting the extended display device, and interrupt the fourth connection to the extended display device when recognizing a scenario of pairing with the extended display device;

the pairing module is configured to: before the terminal device is connected, in the scenario of pairing with the extended display device, reset an enumerated device type to a preset device type, and perform enumeration to complete the pairing with the extended display device;

the configuration file updating module is configured to update a configuration file of the wireless auxiliary stream device based on configuration information that is of the extended display device and obtained in a pairing process, to complete the pairing;

the first transmission module is further configured to interrupt the third connection to the extended display device after the pairing is completed; and the second transmission module is further configured to: after the pairing is completed, establish the second connection to the extended display device when the terminal device is connected, to establish data transmission between the wireless auxiliary stream device and the extended display device.

5. The wireless auxiliary stream device according to claim 1, wherein the first transmission module is a wired transmission module of a universal serial bus (USB) interface, and the second transmission module is a wireless transmission module.

6. A screen projection system, comprising a terminal device, a wireless auxiliary stream device, and an extended display device, wherein the terminal device is connected to the wireless auxiliary stream device;

the extended display device is connected to the wireless auxiliary stream device; and the wireless auxiliary stream device is the wireless auxiliary stream device according to claim 1.

7. A screen projection method based on a wireless auxiliary stream device, applicable to a wireless auxiliary stream device, wherein the wireless auxiliary stream device establishes a first connection to a terminal device and a second connection to an extended display device; and the screen projection method comprises:

displaying an interaction interface on a local display device of the terminal device, wherein a plurality of triggerable function keys are provided on the interaction interface, the function keys comprise program display keys corresponding to a plurality of programs and a screen display key, and the programs are programs currently running on the terminal device;

when receiving a command of a display key of a target program triggered by a user, obtaining to-be-projected data of the target program generated on the terminal device; wherein the to-be-projected data is obtained by collecting program data of the target program in the terminal device; and the to-be-projected data comprises image data and/or audio data;

receiving the to-be-projected data sent by the terminal device; and sending the to-be-projected data to the extended display device, whereby the extended display device receives and displays the to-be-projected data sent by the wireless auxiliary stream device;

wherein there are N target programs, wherein N≥1; and when the to-be-projected data is the image data, the obtaining to-be-projected data of the target program generated on the terminal device specifically comprises:

obtaining an identifier corresponding to the target program;

searching for window image information of the target program from the terminal device based on the identifier, wherein the window image information comprises position information and pixel value information of each pixel in an image of the target program;

generating, on the terminal device, a black area with a same size as a desktop displayed on the local display device; and copying the image of the target program to the black area based on the window image information, to generate the to-be-projected image data.

8. The screen projection method based on a wireless auxiliary stream device according to claim 7, wherein before the displaying an interaction interface on a local display device of the terminal device, further comprising:

transmitting a screen projection program file to the terminal device when the terminal device is connected, whereby the terminal device installs the screen projection program file, wherein the screen projection program file is used to display the interaction interface on the local display device of the terminal device, and when the command of the display key of the target program triggered by the user is received, the to-be-projected data of the target program generated on the terminal device is obtained from the terminal device.

9. The screen projection method based on a wireless auxiliary stream device according to claim 8, wherein there are N target programs, wherein N≥1; the programs comprise the target program and a non-target program located at an upper layer of the target program; and a size of an image displayed by the extended display device is consistent with a size of an image displayed by the local display device, and coordinate axes established by the extended display device and the local display device are consistent; and when the to-be-projected data is the image data, the obtaining to-be-projected data of the target program generated on the terminal device specifically comprises:

recognizing an overlapping portion between an image of the target program and an image of the non-target program, wherein the overlapping portion is an intersection window between a window of the target program and a window of the non-target program located at the upper layer of the target program;

removing the overlapping portion in the image of the target program to obtain a to-be-projected image;

generating, on the terminal device, a black area with a same size as a desktop displayed on the local display device; and obtaining an outer frame coordinate of the to-be-projected image, copying the to-be-projected image to the black area based on the outer-frame coordinate to generate the to-be-projected image data.

10. The screen projection method based on a wireless auxiliary stream device according to claim 9, wherein the obtaining an outer frame coordinate of the to-be-projected image comprises:

obtaining all images displayed on the local display device;

recognizing a plurality of outer frame coordinates of the target program on all the images; and obtaining the outer frame coordinate of the to-be-projected image based on the outer frame coordinates of the target program and the overlapping portion.

11. The screen projection method based on a wireless auxiliary stream device according to claim 7, wherein there are N target programs, wherein N≥1; and when the to-be-projected data is the audio data, the to-be-projected data generated on the terminal device is source audio data of the target program on the terminal device.

12. The screen projection method based on a wireless auxiliary stream device according to claim 7, wherein there are N target programs, wherein N≥1; and when the to-be-projected data is the audio data, the receiving the to-be-projected data sent by the terminal device, and sending the to-be-projected data to the extended display device, whereby the extended display device receives and displays the to-be-projected data sent by the wireless auxiliary stream device specifically comprises:

receiving source audio data sent by the terminal device;

encoding the source audio data; and sending encoded source audio data to the extended display device, whereby the extended display device receives, decodes, and plays the to-be-projected data sent by the wireless auxiliary stream device.

13. The screen projection method based on a wireless auxiliary stream device according to claim 7, before the terminal device is connected, further comprising:

connecting the extended display device, establishing a third connection and a fourth connection to the extended display device, and enumerating the extended display device as a first device type;

recognizing a scenario of connecting the extended display device;

in a scenario of pairing with the extended display device, interrupting the fourth connection to the extended display device;

resetting the enumerated first device type to a preset device type, and performing the pairing with the extended display device;

updating a configuration file based on configuration information that is of the extended display device and obtained in a pairing process to complete the pairing with the extended display device; and interrupting the third connection to the extended display device.

14. The screen projection method based on a wireless auxiliary stream device according to claim 13, wherein the first connection and the third connection are used for wired transmission through a USB interface, and the second connection and the fourth connection are used for wireless transmission.

* * * * *